United States Patent [19]
Katto

[11] Patent Number: 6,111,979
[45] Date of Patent: *Aug. 29, 2000

[54] SYSTEM FOR ENCODING/DECODING THREE-DIMENSIONAL IMAGES WITH EFFICIENT COMPRESSION OF IMAGE DATA

[75] Inventor: Jiro Katto, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/839,175

[22] Filed: Apr. 23, 1997

[30] Foreign Application Priority Data

Apr. 23, 1996 [JP] Japan ................................. 8-101533

[51] Int. Cl.⁷ ...................................... G06K 9/36

[52] U.S. Cl. .......................................... 382/154; 382/232

[58] Field of Search ................................... 382/154, 232, 382/233; 358/426; 345/419

[56] References Cited

U.S. PATENT DOCUMENTS

| | | | |
|---|---|---|---|
| 5,379,369 | 1/1995 | Komma et al. | 395/119 |
| 5,577,175 | 11/1996 | Naka et al. | 395/127 |
| 5,583,656 | 12/1996 | Gandhi et al. | 358/426 |
| 5,754,704 | 5/1998 | Barnsley et al. | 382/249 |
| 5,929,859 | 7/1999 | Meijers | 345/419 |
| 5,995,650 | 11/1999 | Migdal et al. | 382/154 |
| 5,999,641 | 12/1999 | Miller et al. | 382/154 |

FOREIGN PATENT DOCUMENTS

| | | | |
|---|---|---|---|
| 63-100898 | 5/1988 | Japan | H04N 13/00 |
| 63-142794 | 6/1988 | Japan | H04N 15/00 |
| 2-159893 | 6/1990 | Japan | H04N 7/13 |
| 3-115916 | 5/1991 | Japan | G01C 11/06 |
| 5-68268 | 3/1993 | Japan | H04N 13/00 |
| 6-86270 | 3/1994 | Japan | H04N 7/137 |
| 6-153239 | 5/1994 | Japan | H04N 13/00 |
| 8-18975 | 1/1996 | Japan | H04N 7/32 |
| 8-70473 | 3/1996 | Japan | H04N 13/00 |

OTHER PUBLICATIONS

J. Y. A. Wang et al., "Representing Moving Images with Layers", *IEEE Transactions on Image Processing*, vol. 3, No. 5, Sep. (1994), pp. 625–638.

"The Virtual Reality Modeling Language", Version 1.1 Draft, Dec. (1995).

W. A. Schupp et al., "Data Compression of 3–D Moving Pictures Using Adaptive Motion/Disparity Compensation", *Preview of Picture Coding Symposium of Japan of 1988*, 5–1, (1988), pp. 63–64. {partial translation}.

M. Hayashi et al., "Video Composing System by Integration of Real Time Image Processing and Computer Graphics", General Meeting of the Institute of Electronics, Information and Communication of 1995, D–464, Mar. (1995), pp. 190. {partial translation}.

Iguchi et al., "3–D Shape Measurement", Shokodo, (1990), pp. 11–19. {partial translation}.

*Primary Examiner*—Andrew W. Johns
*Attorney, Agent, or Firm*—Foley & Lardner

[57] ABSTRACT

A three-dimensional image encoding system comprising means for picking up an image of an object with a mono-view-point or multi-view-point image pickup system, means for compressing the pickup image and compressing and outputting area dividing information of the pickup image, means for detecting the depth of the object, means for selecting depth representative values by using the area dividing information supplied from the image compression means, means for compressing the depth representative values, means for performing the program description on computer graphics, means for compressing the program description, and means for multiplexing the compressed data which are supplied from the image compression means, the depth representative value compression means and the program description compression means.

44 Claims, 17 Drawing Sheets

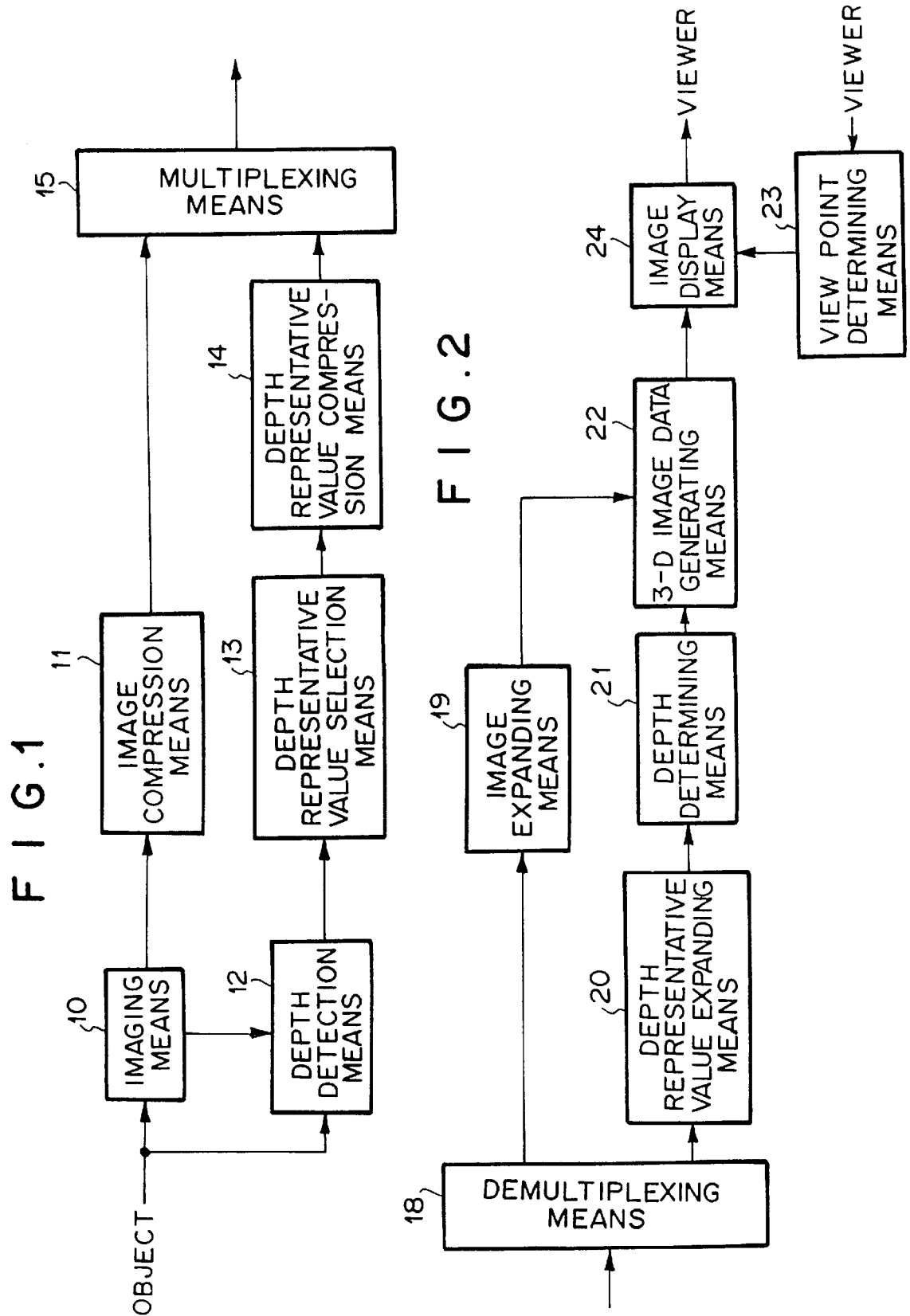

F I G. 12
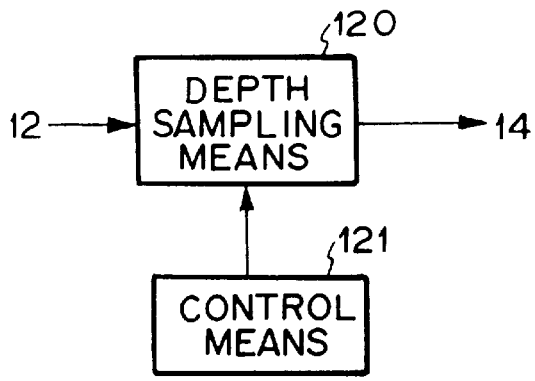
F I G. 13
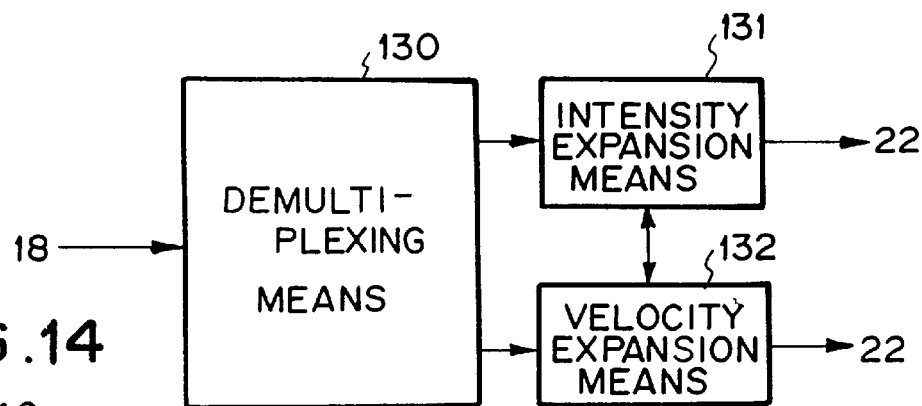
F I G. 14
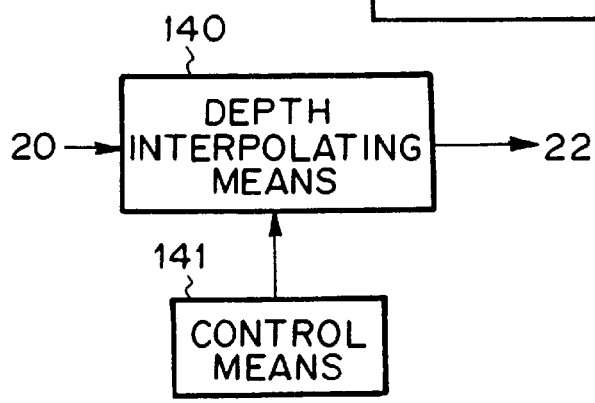
F I G. 15
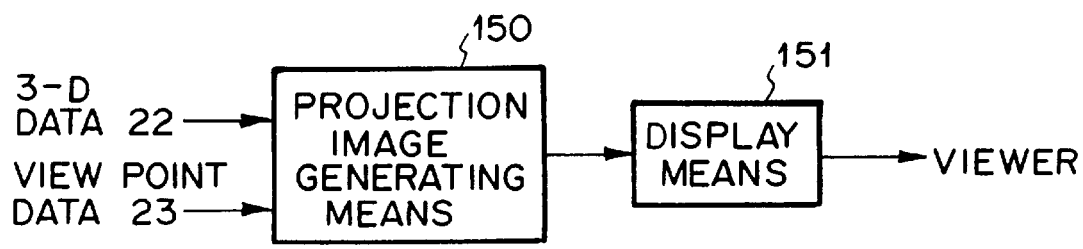

FIG. 24
3-D SPACE
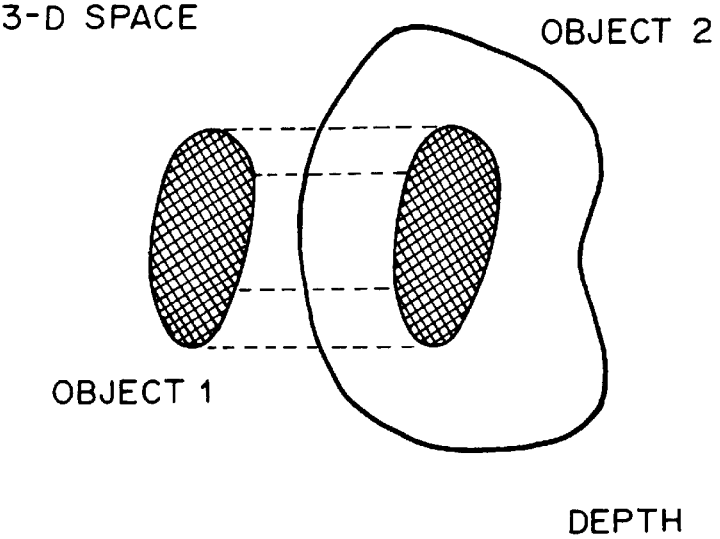
OBJECT 2
OBJECT 1
DEPTH →
DEPTH REPRESENTATIVE
VALUE SELECTING MEANS
AREA MAP
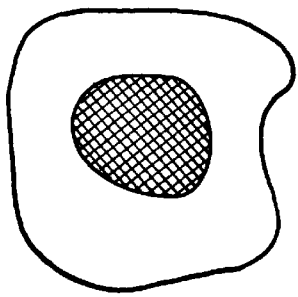
→ AREA INDICATION →
DEPTH MAP
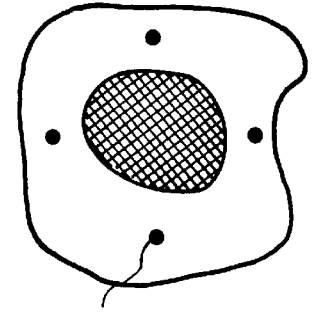
DEPTH REPRESENTATIVE VALUE
DEPTH DETERMINING
MEANS
AREA MAP
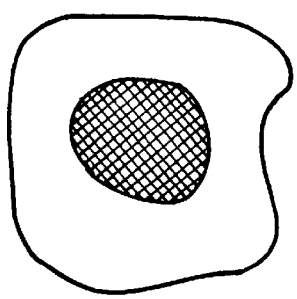
→ INTERPOLATION CONTROL →
DEPTH MAP
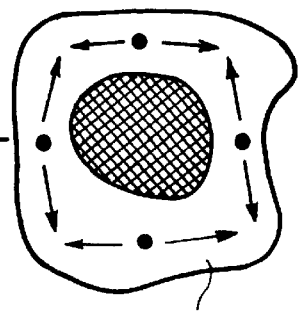
DEPTH INTERPOLATION

SIMPLE THIN-OUT

BLOCK BASIS

PATCH BASIS

OBJECT BASIS

FRAME BASIS

SYSTEM FOR ENCODING/DECODING THREE-DIMENSIONAL IMAGES WITH EFFICIENT COMPRESSION OF IMAGE DATA

BACKGROUND OF THE INVENTION

1. Field of the Invention

The present invention relates to a three-dimensional image encoding/decoding system, and more particularly to a three-dimensional image encoding/decoding system for encoding/decoding an image signal of an object, a depth signal of the object and an external computer graphic signal.

2. Description of Related Art

Recently, there has been actively made an attempt to compose a real image and a computer graphic image, which is represented by a technique as disclosed by Hayashi, Fukui and Miyata, "Video composing system by integration of real time image processing and computer graphics", in General Meeting of Institute of Electronics, Information and Communication of 1995, D-464 (March 1 1995). However, when this technique is applied to a communication system or an accumulation system, there has not been established any system for naturally composing the real image and the computer graphics while efficiently compressing the real image and the computer graphics.

In "The Virtual Reality Modeling Language", Version 1.1 Draft (December 1995), it is described a description system of computer graphics which is based on applications to a communication system, a memory store system. Specifically, a program description is compressed by using a standard compression system of computer data which is called as "gzip", and then the compressed program description is expanded at an observation side (viewing side) to generate computer graphics. However, this technique never teaches any efficient compression system of a three-dimensional natural image.

A conventional compression system for a three-dimensional natural image typically includes a compression system for compressing one of right and left stereo images, a disparity vector and a disparity compensated prediction error such a compression system has been proposed by W. A. Schupp, Yasuda in "Data Compression of 3-D Moving Pictures using Adaptive Motion/Disparity Compensation", Preview of Picture Coding Symposium of Japan of 1988, 5-1 (1988). However, in this system, a camera parameter is indispensable to numerically determine the depth, and the disparity compensated prediction error is entirely insignificant information if the composition with the computer graphics is considered.

Further, a system for dividing a two-dimensional picture signal into plural hierarchical layers and then performing an image encoding is described by J. Y. A. Wang and E. H. Adelson: "Representing Moving Images with Layers", IEEE Trans.on Image Processing, Vol. 3, No. 5, pp. 625–638 (1994-09). Specifically, an intensity (color brightness) map, a velocity map and an area map are extracted from an input picture signal by an image processing method, and then each of these maps are coded. The intensity map is constructed by information on the color brightness of each pixel. The area map is constructed by information representing an area to which each pixel belongs, an object or transparency. The area map may be constructed by information representing representative positions of a triangular patch, a block or the like. The velocity map is constructed by information representing the motion between adjacent frames of each pixel. The difference from an ordinary image encoding system resides in that an area map representing information of object shape in an image is provided. However, this system has no reference to transmission of depth information.

Various systems such as a passive system and an active system as disclosed by Iguchi and Sato in "3-D shape measurement" issued by Shokodo, pp 11–19 (1990) have been known as methods of measuring the depth. However, these systems take no consideration into a system for adding a natural image with depth information which is obtained by using these systems.

As described above, the conventional three-dimensional image encoding/decoding systems as described above have taken little consideration into the efficient compression of depth information. Therefore, an object of the present invention is to realize a three-dimensional image encoding/decoding systems that performs efficiency information compression and composes depth information, natural computer graphics and the like.

SUMMARY OF THE INVENTION

In order to attain the above object, a three-dimensional image encoding system according to a first aspect of the present invention includes imaging means for picking up an image of an object by a mono-view-point or multi-view-point imaging system, image compression means for compressing the pickup image, depth detection means for detecting the depth of the object, depth representative value selecting means for selecting depth representative values, depth representative value compression means for compressing the depth representative values, and multiplexing means for multiplexing compressed data which are obtained by each of the image compression means and the depth representative value compressing means.

Further, a three-dimensional image decoding system according to a second aspect of the present invention includes data separating means for separating compressed data obtained by multiplexing compressed image information and compressed depth representative values, image compressed data expanding means for expanding the separated image compressed data, depth representative value expanding means for expanding the separated depth representative value compressed data, depth determining means for determining the depth of each pixel unit from the expanded depth representative values, three-dimensional data generating means for generating three-dimensional image data by using the expanded pickup image and the depth of the pixel unit, view-point determining means for determining a view point in accordance with an instruction from a viewer (observer), and display means for displaying an image according to the three-dimensional image data and the view-point information.

Still further, a three-dimensional image encoding system according to a third aspect of the present invention includes imaging means for picking up an image of an object by a mono-viewpoint or multi-view-point imaging system, image compression means for compressing the pickup image, depth detection means for detecting the depth of the object, depth representative value selecting means for selecting depth representative values, means for compressing the depth representative values, program description means for performing a program description on computer graphics, program description compression means for compressing the program description, and compressed data multiplexing means for multiplexing compressed data which are given from the image compression means, the depth representative value compressing means and the program description compression means.

Still further, a three-dimensional image decoding system according to a fourth aspect of the present invention includes compressed data separating means for separating compressed data which are obtained by multiplexing compressed image information, compressed depth representative values and compressed program description, compressed image data expanding means for expanding the separated image compressed data, compressed depth representative value expanding means for expanding the separated depth representative value compressed data, depth determining means for determining the depth of each pixel unit from the expanded depth representative values, compressed program description expanding means for expanding the compressed data of the separated program description, computer graphics generating means for generating computer graphics from the expanded program description, three-dimensional image data generating means for generating three-dimensional image data by using the expanded pickup image, the depth of the pixel unit and the generated computer graphics, view-point determining means for determining a view point in accordance with an instruction from a viewer, and display means for performing an image display in accordance with the three-dimensional image data and the view-point information.

Still further, a three-dimensional image encoding system according to a fifth aspect of the present invention includes imaging means for picking up an image of an object by a mono-view-point or multi-view-point imaging system, image compression means for compressing the pickup image and compressing and outputting area dividing information of the pickup image, depth detection means for detecting the depth of the object, depth representative value selecting means for selecting depth representative values by using the area dividing information which is provided from the image compression means, depth representative value compressing means for compressing the depth representative values, and multiplexing means for multiplexing the compressed data which are provided from each of the image compression means and the depth representative value compressing means.

Still further, a three-dimensional image decoding system according to a sixth aspect of the present invention includes compressed data separating means for separating compressed data which are obtained by multiplexing compressed image information and compressed depth representative values, image expanding means for expanding the separated image compressed data, depth representative value expanding means for expanding the separated depth representative value compressed data, depth determining means for determining the depth of each pixel unit from the expanded depth representative values by using area dividing information which is provided from the image expanding means, three-dimensional image generating means for generating three-dimensional image data by using the expanded pickup image and the depth of the pixel unit, view point determining means for determining a view point in accordance with an instruction from a viewer, and display means for performing an image display according to the three-dimensional image data and the view-point information.

A three-dimensional image encoding system according to a seventh aspect of the present invention includes imaging means for picking up an image of an object by a mono-view-point or multi-view-point imaging system, image compression means for compressing the pickup image and compressing and outputting area dividing information of the pickup image, depth detection means for detecting the depth of the object, depth representative value selecting means for selecting depth representative values by using the area dividing information provided from the image compression means, depth representative value compressing means for compressing the depth representative values, program description means for performing a program description on computer graphics, program description compression means for compressing the program description, and multiplexing means for multiplexing the compressed data which are provided from the image compression means, the depth representative value compressing means and the program description compressing means.

Further, a three-dimensional image decoding system according to an eighth embodiment of the present invention includes compressed data separating means for separating compressed data which are obtained by multiplexing compressed image information, compressed depth representative values and compressed program description, image expanding means for expanding the separated image compressed data, depth representative value expanding means for expanding the separated depth representative value compressed data, depth determining means for determining the depth on a pixel basis from the expanded depth representative values by using area dividing information which is obtained from the image expanding means, program description expanding means for expanding the compressed data of the separated program description, computer graphics generating means for generating computer graphics from the expanded program description, three-dimensional image generating means for generating three-dimensional image data by using the expanded pickup image, the depth of the pixel unit and the generated computer graphics, view point determining means for determining a view point in accordance with an instruction from a viewer, and display means for performing an image display according to the three-dimensional image data and the view-point information.

BRIEF DESCRIPTION OF THE DRAWINGS

FIG. 1 is a block diagram showing a three-dimensional image encoding system according to a first embodiment of the present invention;

FIG. 2 is a block diagram showing a three-dimensional image decoding system according to a second embodiment of the present invention;

FIG. 12 is a block diagram showing the construction of depth representative value selection means 13;

FIG. 13 is a block diagram showing the construction of image expanding means 19;

FIG. 14 is a block diagram showing the construction of depth determining means 21;

FIG. 15 is a block diagram showing the construction of image display means 24;

FIG. 24 is a block diagram showing depth representative value selection means using area dividing information and depth determining means.

DETAILED DESCRIPTION OF THE PREFERRED EMBODIMENTS

Preferred embodiments according to the present invention will be described hereunder with reference to the accompanying drawings.

Figure 20:
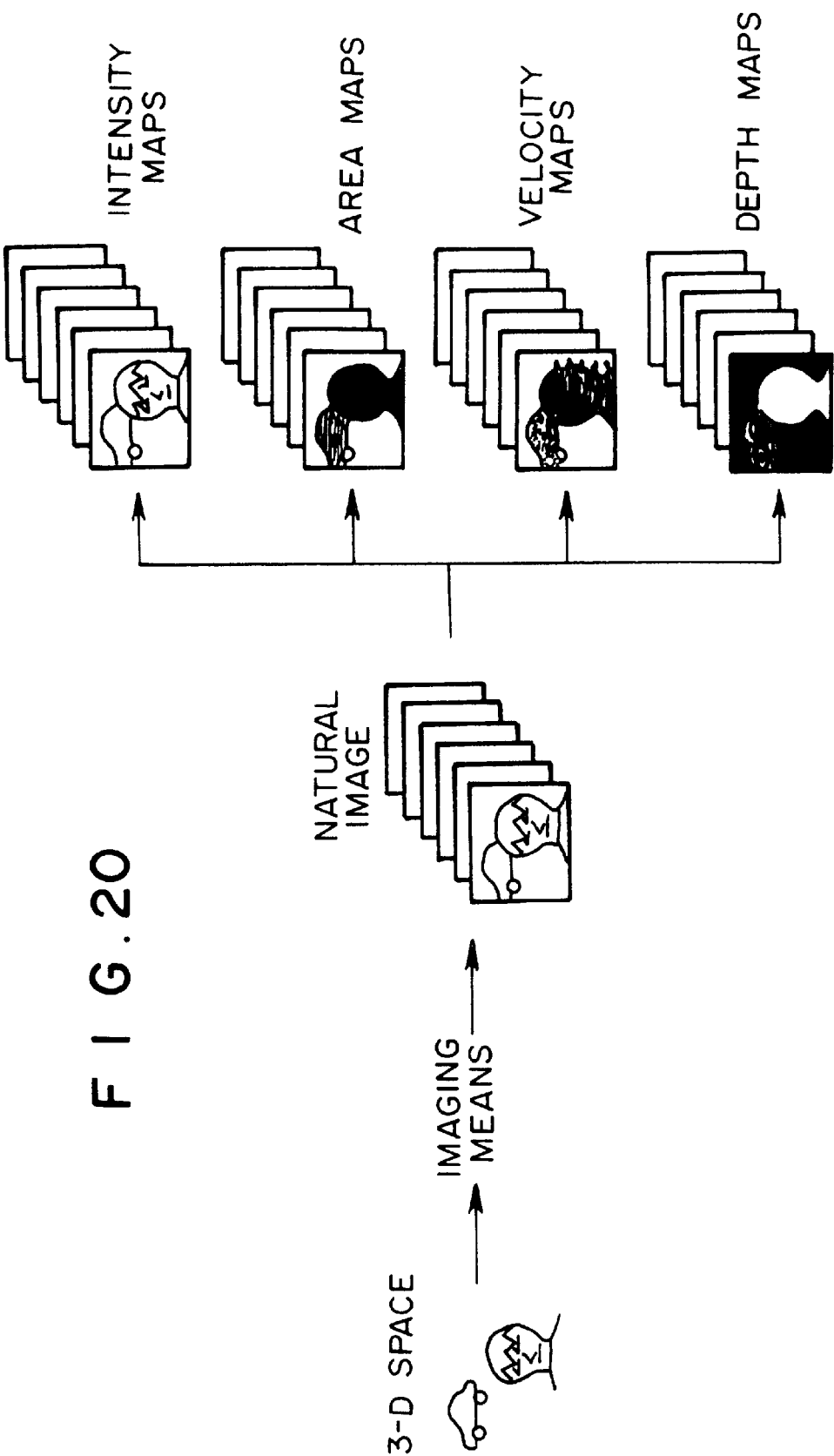
FIG. 20 is a block diagram showing generation of an intensity map, an area map, a velocity map and a depth map.

FIG. 20 conceptually shows the function of a encoding side of the present invention. As shown in FIG. 20, two-dimensional natural images are obtained from an object in a three-dimensional space by a mono-view-point or multi-view-point imaging system to generate intensity (color brightness) maps, area maps, velocity maps and depth maps, and then these maps are compressed and transmitted or stored.

Figure 21:
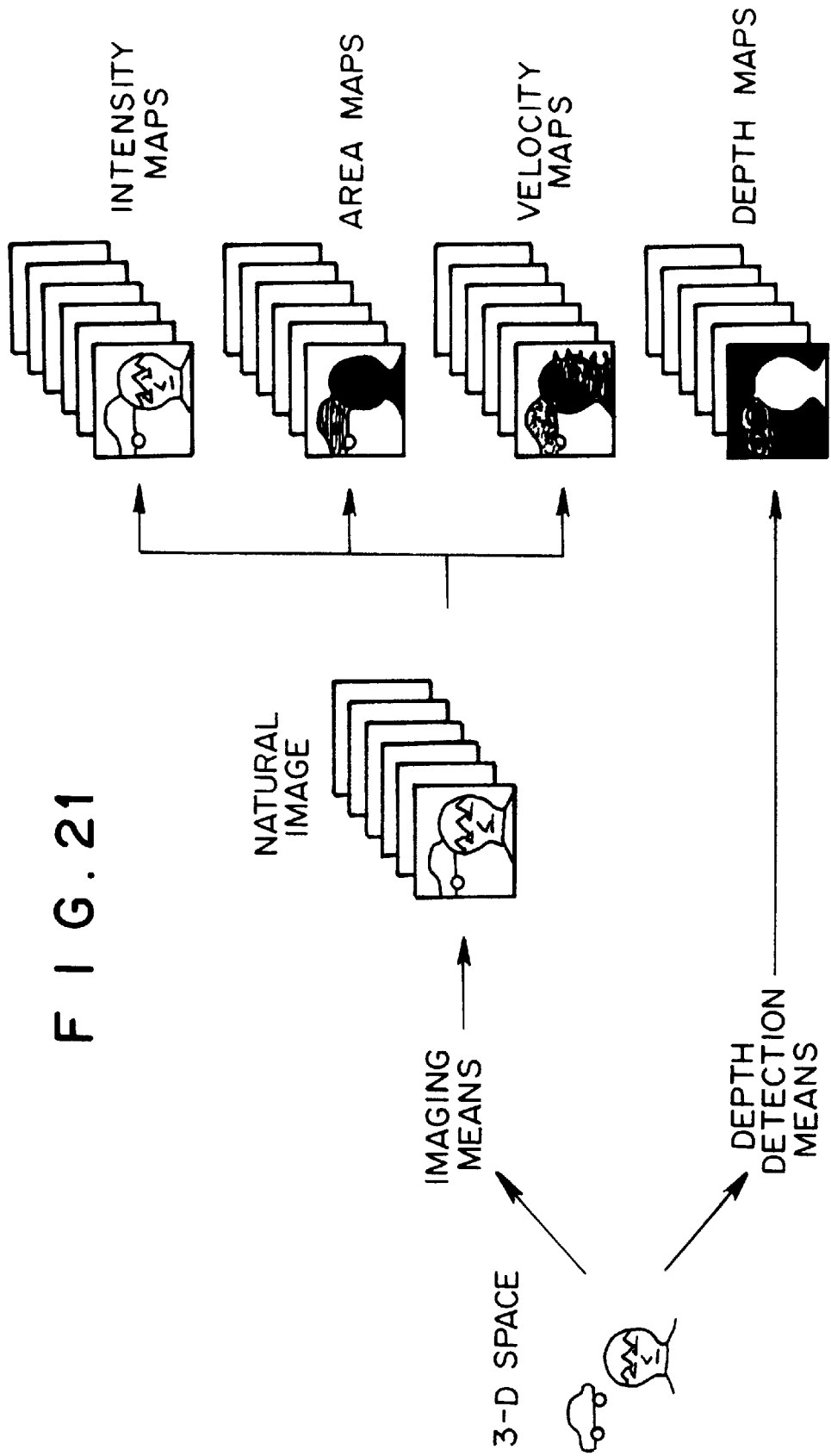
FIG. 21 is a block diagram showing generation of an intensity map, an area map, a velocity map and a depth map.

FIG. 21 also conceptually shows the function of the encoding side of the present invention. In FIG. 21, two-dimensional natural images are obtained from an object in a three-dimensional space by a mono-view-point or multi-view-point imaging system to generate intensity (color brightness) maps, area maps and velocity maps, and also depth maps are generated by using depth detection means which is different from the imaging system. These maps are compressed and transmitted or stored.

Figure 22:
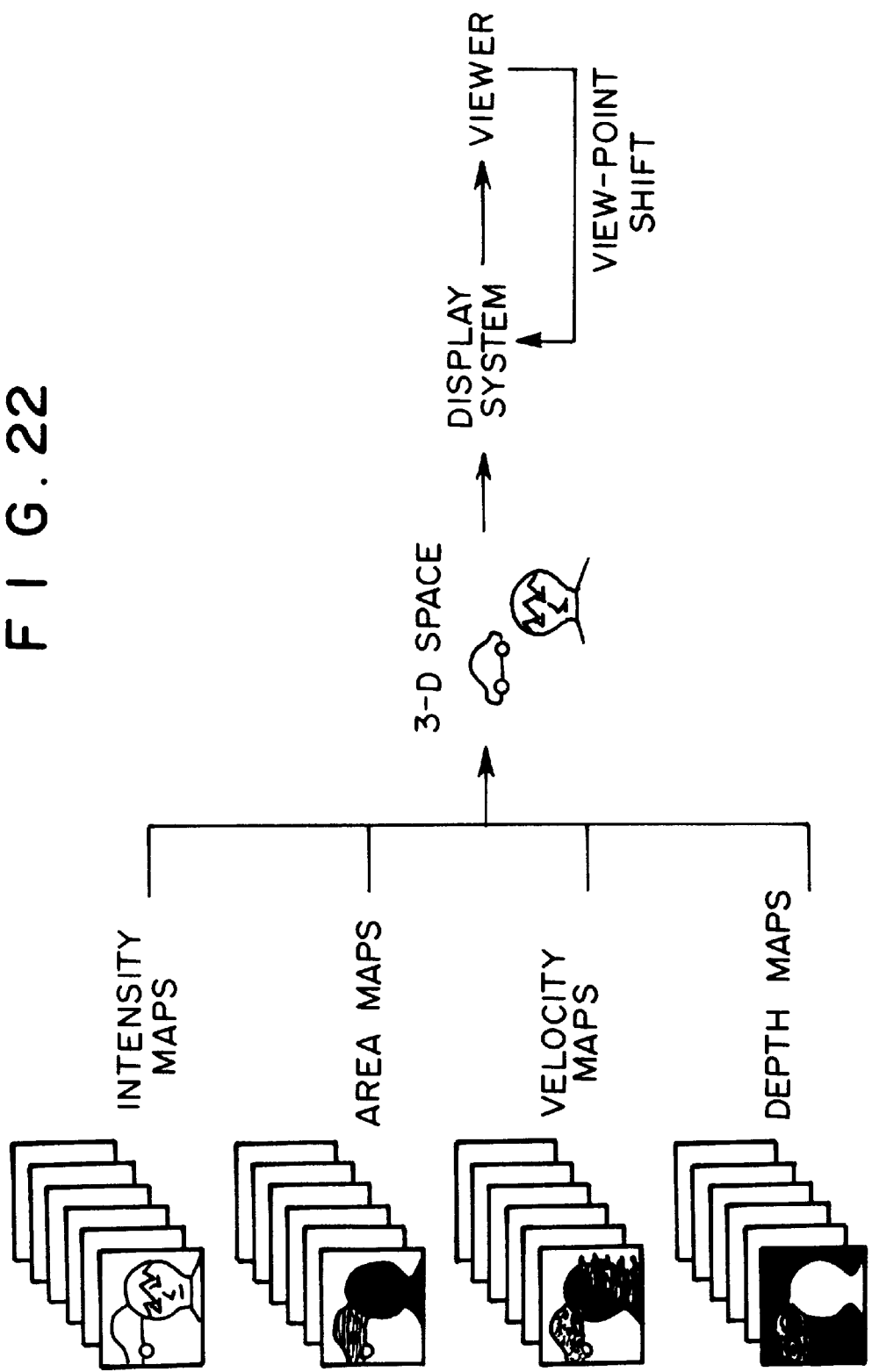
FIG. 22 is a block diagram showing generation of three-dimensional image data.

FIG. 22 conceptually shows the function of a decoding side of the present invention. As show in FIG. 22, the three-dimensional space is restored by using the expanded intensity maps, the expanded area maps, the expanded velocity maps and the expanded depth maps, and then a viewer (observer) sees the object through a display system of a three-dimensional image while shifting his (her) view point.

FIG. 1 shows a encoding system according to a first embodiment of the present invention. In FIG. 1, imaging means 10 picks up an image of an object to be observed (viewed). Image compression means 11 compresses an image signal supplied from the imaging system 10. Specifically, the intensity maps, the area maps and the velocity maps are generated from the pickup image, and then they are compressed. Alternatively, as in the case of an ordinary image encoding system, the intensity maps and the velocity maps are generated and compressed. Further, depth detection means 12 detects the depth of the object to be observed to generate the depth maps on a pixel basis, which correspond to the pickup image. In this case, an input image signal supplied from the imaging means 10 may be used if occasion demands. Depth representative value selection means 13 thins out the depth maps which are obtained by the depth detection means 12. Specifically, a sampling operation is performed according to a predetermined pattern or the like. The depth representative value compressing means 14 compresses depth representative values which are supplied by the depth representative value selection means 13. Specifically, a set of depth representative values is regarded as an image, and the ordinary image encoding system or the like is applied to the image. Multiplexing means 15 multiplexes compressed data which are supplied from the image compression means 11 and the depth representative value compressing means 14, and then transmit or store it as a compression stream.

Next, the image compression means 11, the depth detection means 12 and the depth representative value selection means 13 which are somewhat complicated in construction will be described in more detail.

Figure 9:
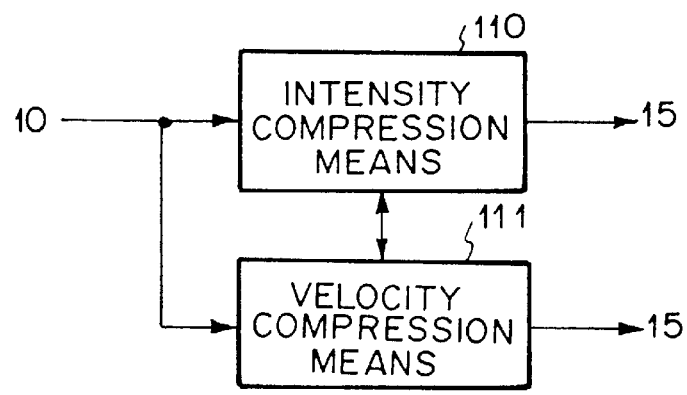
FIG. 9 is a block diagram showing the construction of image compression means 11.

FIG. 9 shows the construction of the image compression means 11.

In FIG. 9, intensity (color brightness) compression means 110 compresses the intensity (color brightness) information of an input image signal, and velocity compression means 111 compresses motion information of the input image signal. A system in conformity to H.261, H.262, MPEG1, MPEG2, etc. which are known as international standard systems of moving picture signals can be applied to the above compression means. This is also applied to the depth representative value compression means 14.

Figure 10:
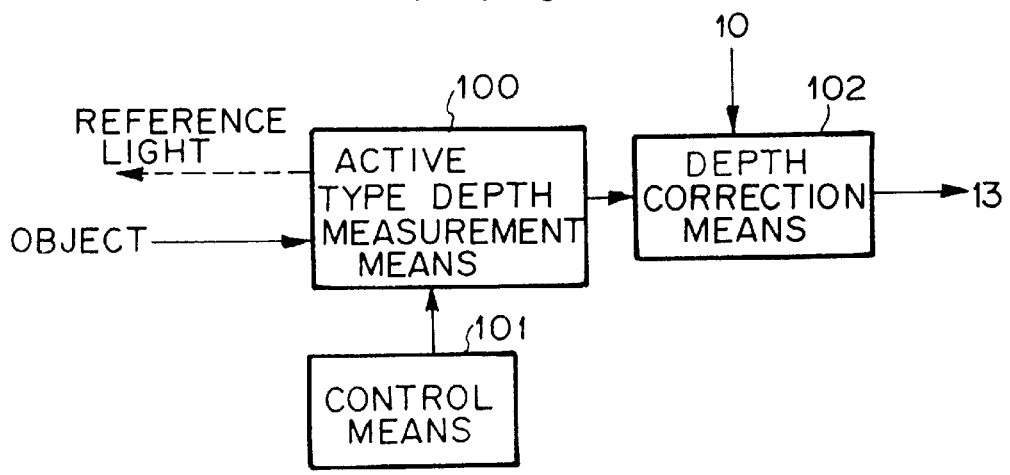
FIG. 10 is a block diagram showing a first construction of depth detection means 12.

FIG. 10 shows the construction of the depth detection means 12 which is based on an active type depth measurement. Active type depth measurement means 100 performs a depth measurement of a target object by an active depth measurement system which is represented by a range finder or the like. The arrow directing to the object in FIG. 10 represents a reference light such as a radar beam, slit light or the like. Further, the arrow emitting from the object in FIG. 10 represents reflection light which is reflected from the object. Control means 101 serves to perform physical position control on the reference light source of the active depth measurement system and a reception light source thereof. Depth correction means 102 corrects obtained depth information in accordance with the resolution of the active type depth measurement means 100 by a linear interpolation method, a thinning method or the like so as to establish the one-to-one corresponding relationship with the pixels of a pickup image which is obtained by the imaging means 10, and outputs the result to the depth representative value selection means 13.

Figure 11:
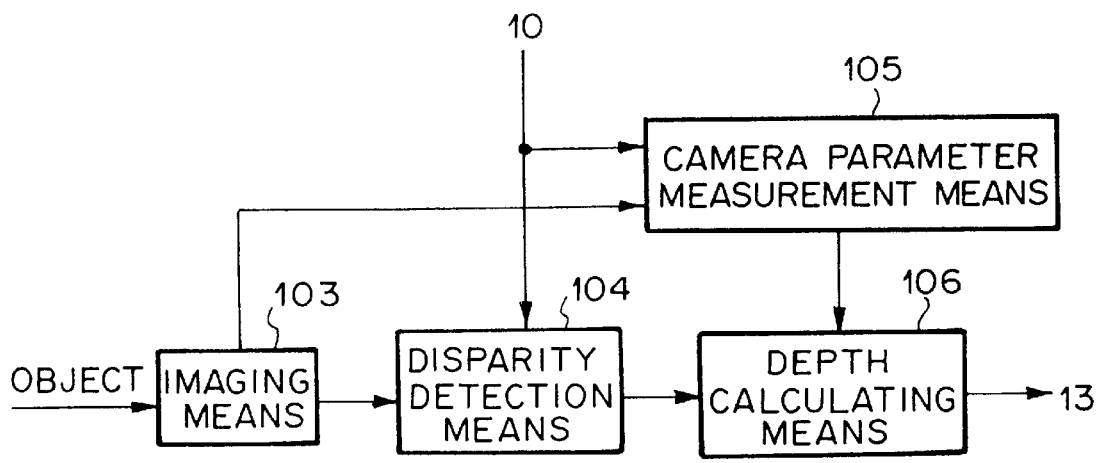
FIG. 11 is a block diagram showing a second construction of the depth detection means 12.

FIG. 11 shows the construction of the depth detection means 12 based on an passive type depth measurement. Imaging means 103 picks up an image of the object from a position which is horizontally different from the position of the imaging means 10. Disparity detection means 104 detects the disparity between the images obtained by the imaging means 10 and the imaging means 103. Camera parameter measurement means 105 measures camera parameters such as the distance between the imaging means 10 and the imaging means 103, the focus distances of these imaging means 10 and 103, etc. Depth calculation means 106 calculates depth data with the disparity data of on-pixel-basis which are supplied from the disparity detection means 104 and the camera parameters which are supplied from the camera parameter measurement means 105, and outputs the calculation result to the depth representative value selection means 13.

FIG. 12 shows the construction of the depth representative value selection means 13. Depth sampling means 120 samples depth data in accordance with a sampling pattern which is supplied from control means 121. The control means 121 supplies a predetermined sampling pattern to the depth sampling means 120. Specifically, as a system for obtaining the sampling pattern, are considered a simple sampling system shown in (a) of FIG. 25, a block-based sampling system shown in (b) of FIG. 25, etc.

FIG. 2 shows an image decoding system according to a second embodiment of the present invention. Demultiplexing means 18 performs multiplex and separation of a compressed stream to separate the compressed data of the pickup image and the compressed data of depth representative values. Image expanding means 19 expands the compressed data of the pickup image which is supplied from the demultiplexing means 18. Depth representative value expanding means 20 expands the compressed data of the depth representative values which are supplied from the demultiplexing means 18. Depth determining means 21 calculates depth values for an image from which the depth values are thinned out, by using the depth representative values which are supplied from the depth representative value expanding means 20. Specifically, an interpolative calculation or the like is performed by using the depth representative values of adjacent pixels.

Three-dimensional image data generating means 22 generates three-dimensional image data by using a decoded image supplied from the image expanding means 19 and the pixel-basis depth values supplied from the depth determining means 21. In accordance with an instruction from a viewer, view-point determining means 23 determines a view point of the viewer to the three-dimensional image data which are supplied from the three-dimensional image data generating means 24. A pointing device such as a mouse, keys of a keyboard, a joy stick for games, etc. may be used as an user's instruction input means. Image display means 24 performs a geometrical transformation on the three-dimensional image data supplied from the three-dimensional image data generating means 22 in accordance with the view point of the viewer which is given from the view-point determining means 23, exhibiting the transformation result to the viewer through a display medium.

Next, the image expanding means 19, the depth determining means 21 and the image display means 24 which are somewhat complicated in construction will be described in more detail.

FIG. 13 shows the construction of the image expanding means 19.

Demultiplexing means 130 further separates the compressed data of the pickup image given from the demultiplexing means 18 into the compressed data of intensity (color brightness) and the compressed data of velocity. Intensity expanding means 131 expands the compressed data of intensity, and outputs the expanded data to three-dimensional image data generating means 22. Velocity expanding means 132 expands the compressed data of velocity, and outputs the expanded data to the three-dimensional image data generating means 22. H.261, H263, MPEG1, MPEG2 or the like which is known as an international standard system of moving picture signals may be applied to these expanding means. That is, the intensity expanding means 131 and the velocity expanding means 132 performs the expansion of the compressed data while mutually exchanging the data to each other. This is also applied to the depth representative value expanding means 20.

FIG. 14 shows the construction of the depth determining means 21. Depth interpolating means 140 interpolates the depth values corresponding to the image which is thinned out, and outputs the result to the three-dimensional image data generating means 22. Control means 141 determines an interpolative calculation to be performed by the depth interpolating means 140 in consideration of a predetermined sampling pattern.

FIG. 15 shows the construction of the image display means 24. On the basis of the three-dimensional data of an image supplied from the three-dimensional image data generating means 22 and the view-point data of the viewer which is supplied from the view-point determining means 23, projection image generating means 150 generates a projection image of three-dimensional image data which is viewed from the view point of the viewer, and outputs the projection image to the display means 151. The display means 151 provides the viewer with the projection image given from the projection image generating means 150 by using an image display device (ordinarily, a two-dimensional display, or a three-dimensional display such as a lenticular, a parallax barrier or the like) which is prepared in advance. Further, three-dimensional image data of a natural image are prepared to facilitate the composition with the computer graphics.

Figure 23:
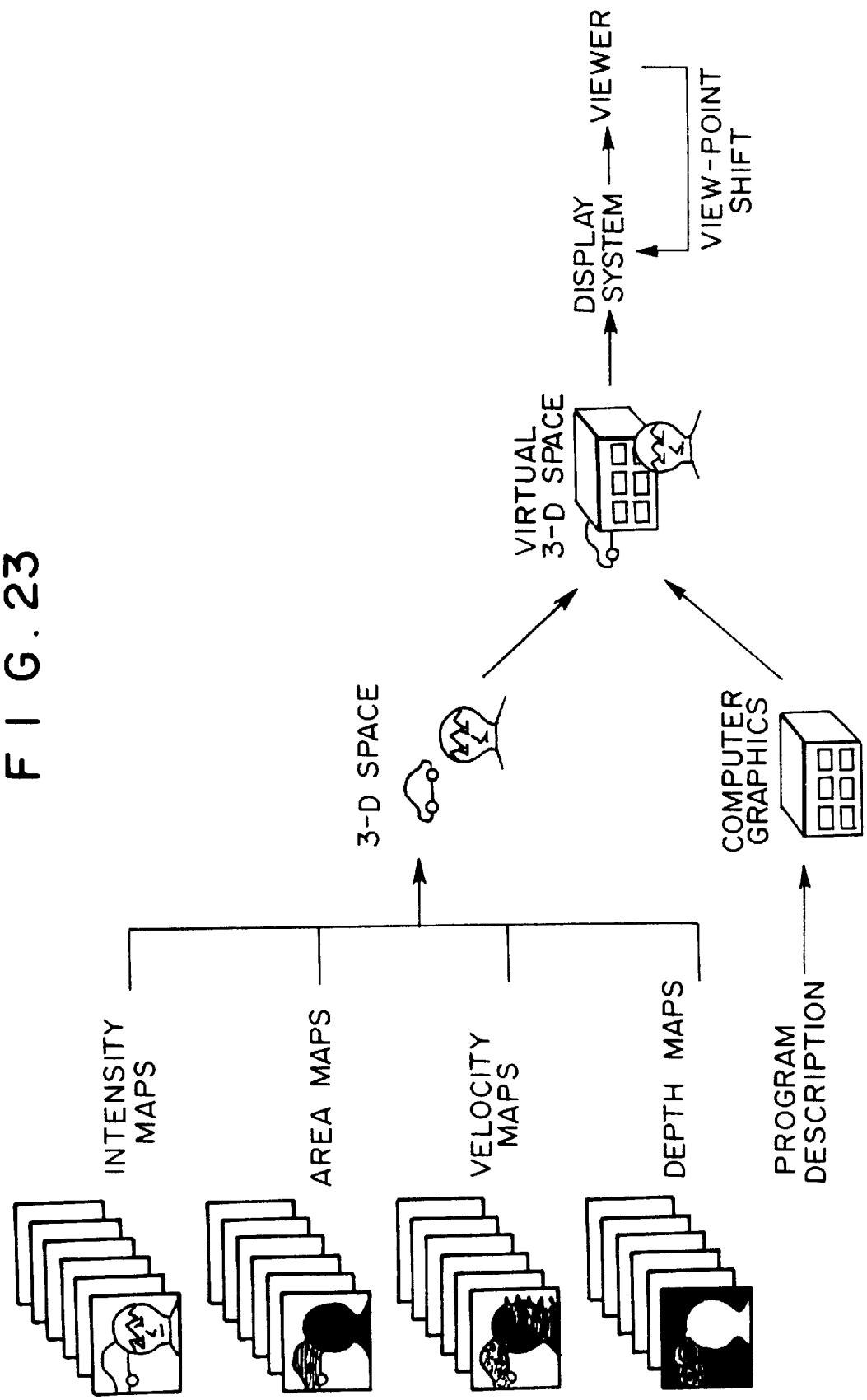
FIG. 23 is a block diagram showing generation of three-dimensional image data.
Figure 25A:
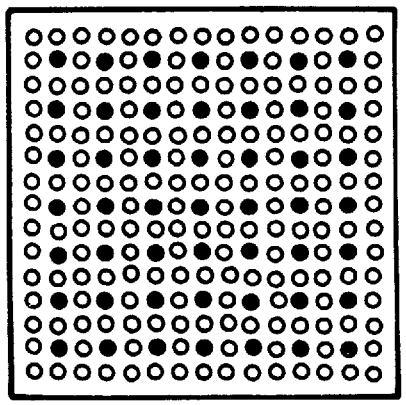
FIGS. 25a to 25e are a block diagram showing a depth sampling system.
Figure 25B:
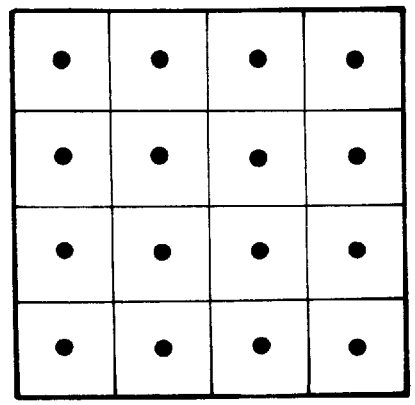
Figure 25C:
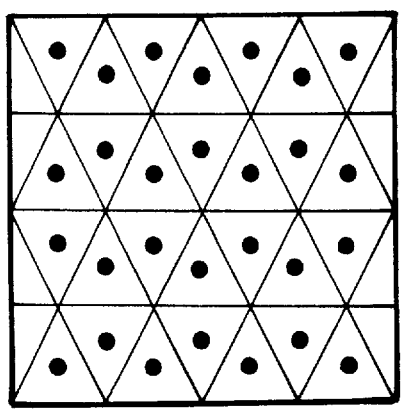
Figure 25D:
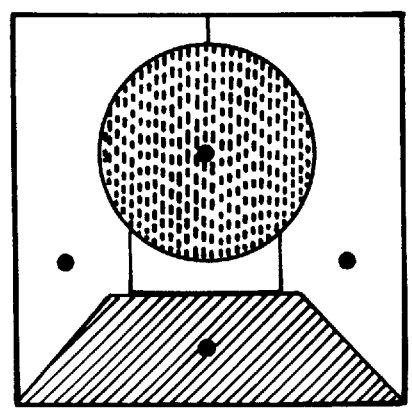
Figure 25E:
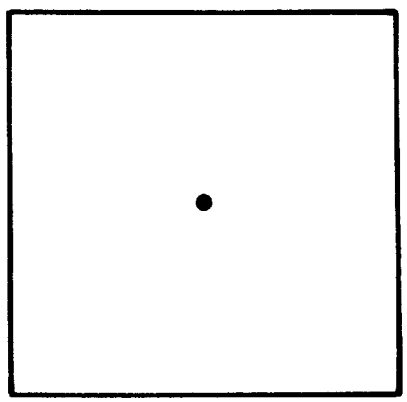

FIG. 23 conceptually shows the function of the decoding side of the present invention. The three-dimensional space of the natural image is restored by using the expanded intensity maps, area maps, velocity maps and depth maps, and the three-dimensional space based on the computer graphics is constructed. Both the spaces are composed to form a virtual three-dimensional space, and the viewer views the object through the three-dimensional image display system while shifting his or her viewing point.

Figure 3:
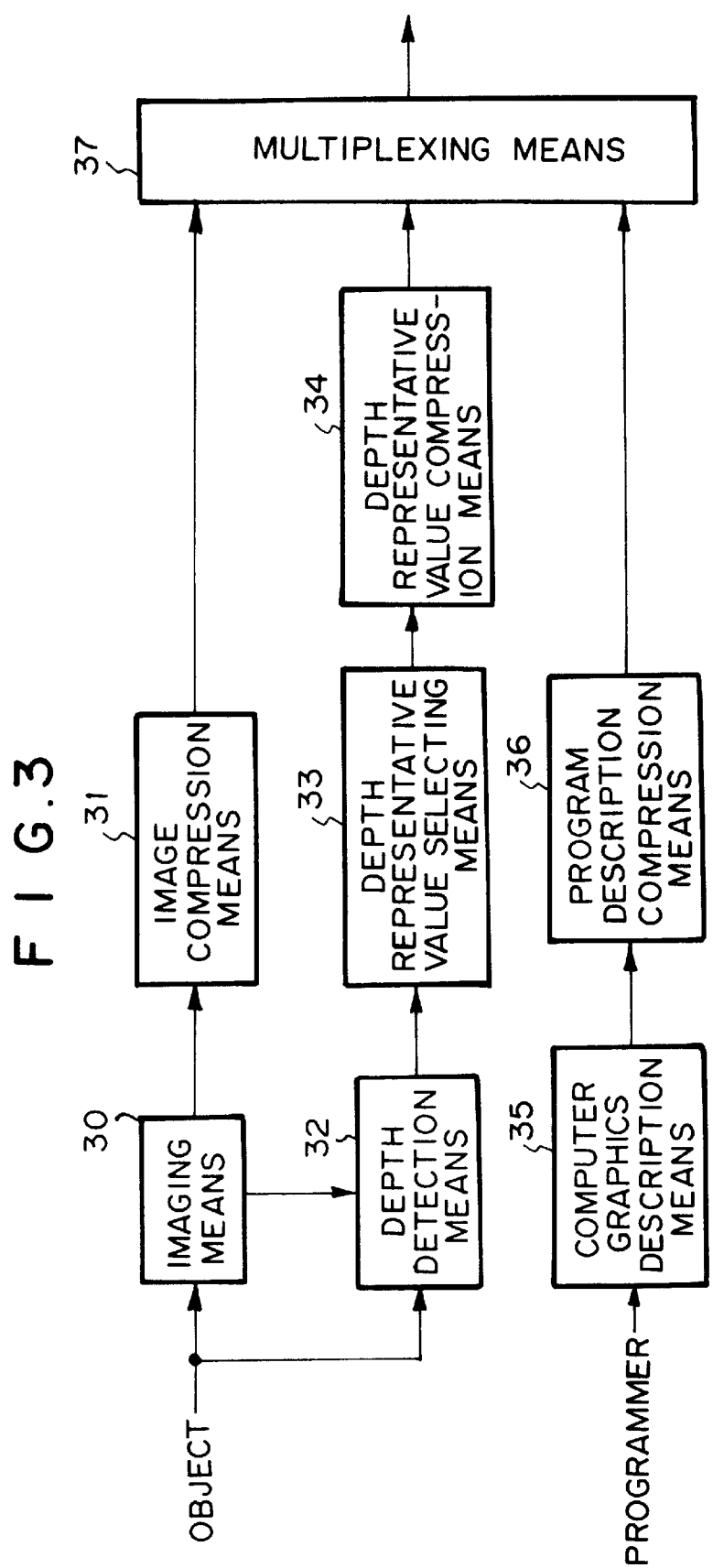
FIG. 3 is a block diagram showing a three-dimensional image encoding system according to a third embodiment of the present invention.

FIG. 3 shows a encoding system according to a third embodiment of the present invention.

In FIG. 3, imaging means 30 picks up an image of an object to be viewed. Image compression means 31 compresses an image signal supplied from the imaging means 30. Specifically, intensity maps, area maps and velocity maps are generated from the pickup image, and these maps are compressed. Alternatively, as in the case of the ordinary image encoding system, the intensity maps and the velocity maps are generated, and then compressed. Further, the depth of the object is detected by depth detection means 32 to generate pixel-basis depth maps which correspond to the pickup image. The depth representative value selection means 33 thins out the depth maps which are obtained by the depth detection means 32. Specifically, it performs the sampling operation in accordance with a predetermined pattern. Depth representative value compressing means 34 compresses the depth representative values which are supplied from the depth representative value selection means 33. Specifically, a set of depth representative values is regarded as an image, and an ordinary image encoding system is applied to the image of a set of depth representative value.

Computer graphics description means 35 describes computer graphics according to a predetermined syntax. Program description compressing means 36 compresses the program description of the computer graphics supplied from the computer graphics description means 35. Specifically, a tool such as gzip which is usually used as compression means for computer data is used. Multiplexing means 37 multiplexes the compressed data which are supplied from the image compression means 31, the depth representative value compression means 34 and the program description compression means 36, and transmits or stored the multiplexed data as a compression stream.

The construction of each of the imaging means 30, the image compression means 31, the depth detection means 32, the depth representative value selection means 33 and the depth representative value compression means 34 is the same as the first embodiment.

Figure 4:
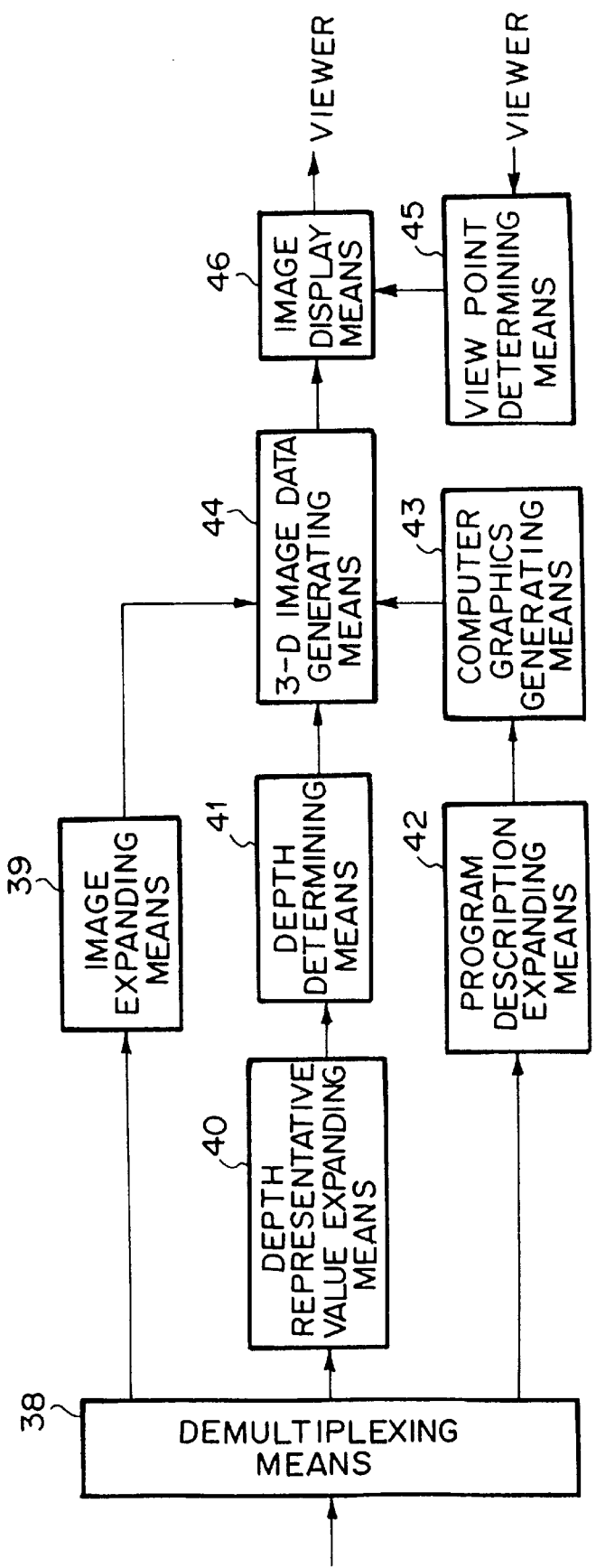
FIG. 4 is a block diagram showing a three-dimensional image decoding system according to a fourth embodiment of the present invention.

FIG. 4 shows a decoding system according to a fourth embodiment of the present invention. Demultiplexing means 38 performs a demultiplexing operation on a compression stream to separate the compressed data of the pickup image, the compressed data of the depth representative values and the compression of the program description of the computer graphics from one another. Image expanding means 39 expands the compressed data of the pickup image which is supplied from the demultiplexing means 38. Depth representative value expanding means 40 expands the compressed data of the depth representative values which are supplied from the demultiplexing means 38. By using the depth representative values supplied from the depth representative value expanding means 40, depth determining means 41 calculates the depth values corresponding to an image from which the depth values are thinned out. Specifically, the interpolative calculation or the like is performed on the basis of the depth representative values of adjacent pixels. Program description expanding means 42 expands the compressed data of the program description of the computer graphics which are supplied from the demultiplexing means 38.

The computer graphics generating means 43 generates computer graphics by using the program description of the computer graphics which is supplied from the program description expanding means 42. The computer graphics data generally comprise the coordinate values of three-dimensional shape, intensity (color brightness) values, etc. Three-dimensional image data generating means 44 generates three-dimensional image data comprising a composition of a natural image and computer graphics by using the decoded image supplied from the image expanding means 39, the pixel-basis depth values supplied from the depth determining means 41 and the computer graphics data supplied from the computer graphics generating means 43.

View-point determining means 45 determines a view point of a viewer to the three-dimensional image data supplied from the three-dimensional image data generating means 44 in accordance with an instruction from the viewer. Specifically, a pointing device such as a mouse, keys of a keyboard, a joy stick for games or the like may be used for the instruction of the viewer. Image display means 46 performs a geometrical transformation on the three-dimensional image data supplied from the three-dimensional image data generating means 44 in accordance with the view point of the viewer which is supplied from the view point determining means 45, and shows a three-dimensional display to the viewer through a display medium.

The construction of each of the image expanding means 39, the depth representative value expanding means 40, the depth determining means 41, the view point determining means 45 and the image display means 46 is the same as the second embodiment. The three-dimensional image data generating means 44 adds the natural image and the computer graphics to integrate both the three-dimensional data of the natural image supplied from the image expanding means 39 and the depth determining means 41 and the three-dimensional data of the computer graphics supplied from the computer graphics generating means 43 and hold the integrated three-dimensional image data.

When the simple thin-out operation of depth values is performed in the depth representative value selecting means 13,33, it is estimated that even an originally discontinuous boundary portion is erroneously reproduced as a smooth depth portion in the depth determining means 12,32 due to the interpolative calculation. This frequently causes unnatural reproduction of depth, and becomes a critical problem. Therefore, this problem can be solved by using alpha maps representing area, object information which is obtained in the image compression means 11, 31.

FIG. 24 shows an example when the alpha maps are used. At the encoding side, the depth representative values are sampled from the depth maps in accordance with area dividing information which is defined by the area maps. At the decoding side, like the encoding side, the interpolation of the depth is performed according to the area dividing information defined by the area maps. Specifically, with respect to the areas which are defined as belong to the same object by the area maps, the depth value of each pixel is determined by the interpolative calculation of the depth representative values. On the other hand, with respect to areas which are defined as belonging to different objects, the depth value of each pixel is determined by an interpolative calculation which uses no depth representative values belonging to a different object. With this processing, occurrence of unnatural depth can be prevented.

Figure 5:
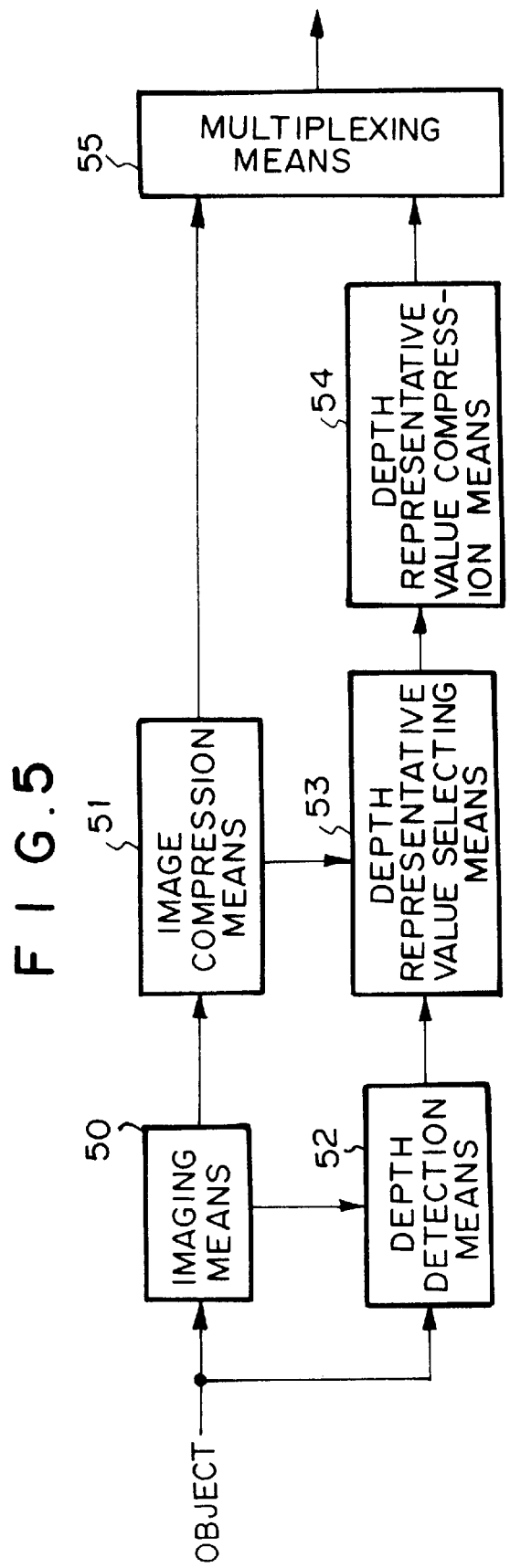
FIG. 5 is a block diagram showing a three-dimensional image encoding system according to a fifth embodiment of the present invention.

FIG. 5 shows a encoding system according to a fifth embodiment of the present invention.

In FIG. 5, imaging means 50 picks up an image of an object to be viewed, and image compression means 51 compresses an image signal supplied from the imaging means 50. Specifically, intensity (color brightness) maps, area maps and velocity maps are generated from the pickup image, and compressed. Depth detection means 52 detects the depth of the object to generate pixel-basis depth maps corresponding to the pickup image. Depth representative value selection means 53 thins out the depth maps obtained by the depth detection means 52 by using the area maps supplied from the image compression means 51. Specifically, the depth values of the image at the center point of the area indicated by the supplied area maps are sampled, the depth values of pixels at the boundary of the adjacent areas, etc.

Depth representative value compression means 54 compresses the depth representative values which are supplied from the depth representative value selection means 53. Specifically, a set of depth representative values is regarded as an image, and an ordinary image encoding system is applied to the image. Multiplexing means 55 multiplexes the compressed data which are supplied from the image compression means 51 and the depth representative value compression means 54, and transmits or stores the multiplexed data as a compression stream.

Next, the image compression means 51 and the depth representative value selection means 53 which are somewhat complicated in construction will be described hereunder. The construction of each of the imaging means 50, the depth detection means 52 and the depth representative value compression means 54 is the same as the first embodiment.

Figure 16:
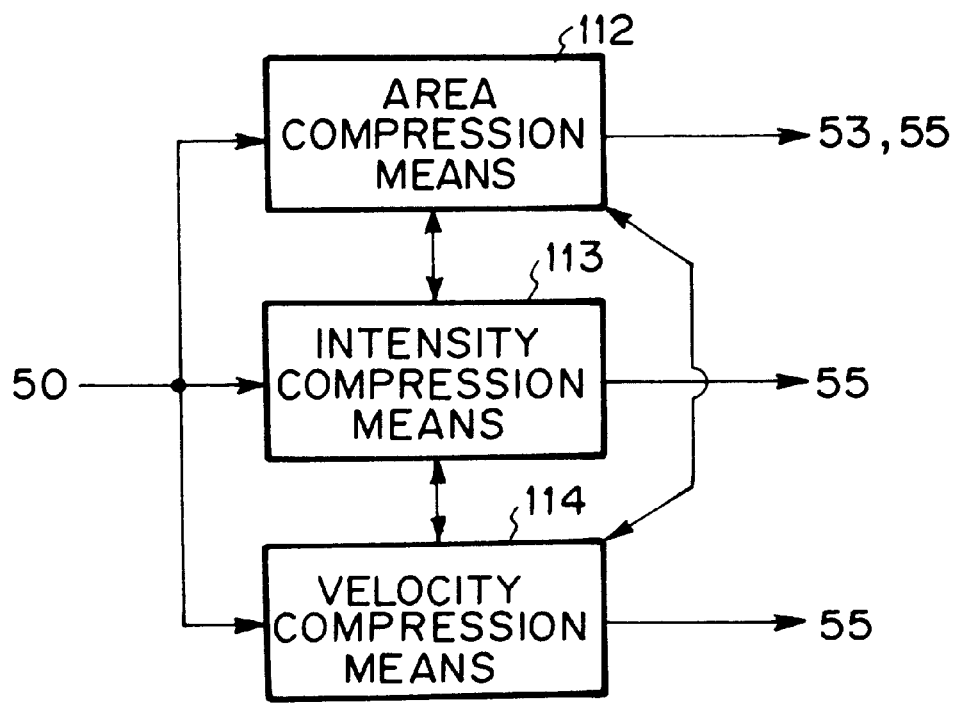
FIG. 16 is a block diagram showing the construction of image compression means 51.

FIG. 16 shows the construction of the image compression means 51.

In FIG. 16, area compression means 112 compresses the area dividing data of an input image. Intensity (color brightness) compression means 113 compresses intensity (color brightness) information of the input image signal, and velocity compression means 114 compresses motion information of the input image signal. These compression means perform efficient compression while mutually exchanging data to each other. H.261, H263, MPEG1, MPEG2, etc. which are known as international standard systems for moving picture signals may be applied to the intensity compression means 113 and the velocity compression means 114. Further, in the case where area compression means 112 is contained, a compression system in conformity to MPEG4 known as an international standard system for moving picture signals, which is under consideration.

Figure 17:
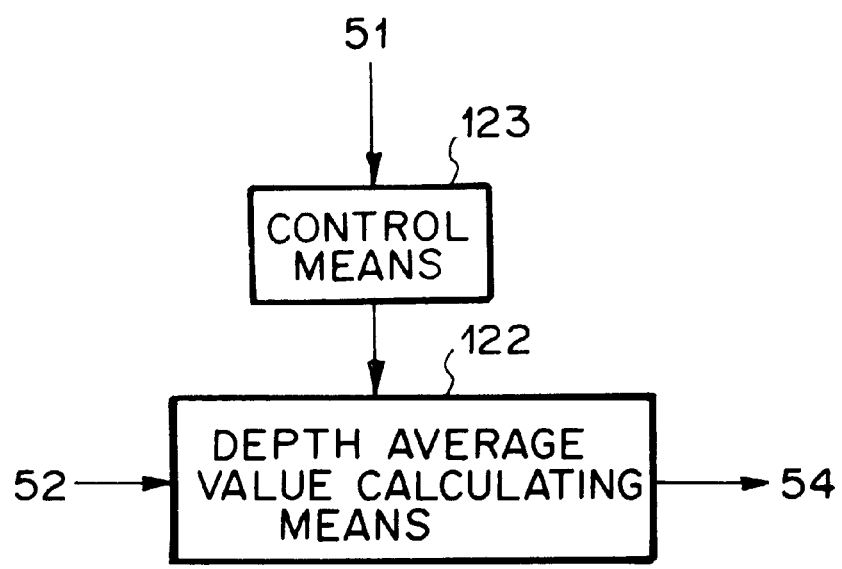
FIG. 17 is a block diagram showing the construction of depth representative value selection means 53.

FIG. 17 shows the construction of the depth representative value selection means 53. Depth average value calculation means 122 calculates an average value of depth data in an area which is supplied from control means 123, and outputs the calculation result as an area-basis depth representative value to depth representative value compression means 54. The control means 123 controls the area-basis depth calculation in the depth average value calculation means 122 according to the area dividing data supplied from the image compression means 51. Specifically, a patch unit shown in (c) of FIG. 25, an object unit shown in (d) of FIG. 25, a frame unit shown in (e) of FIG. 25 or the like may be used as an area unit.

Figure 6:
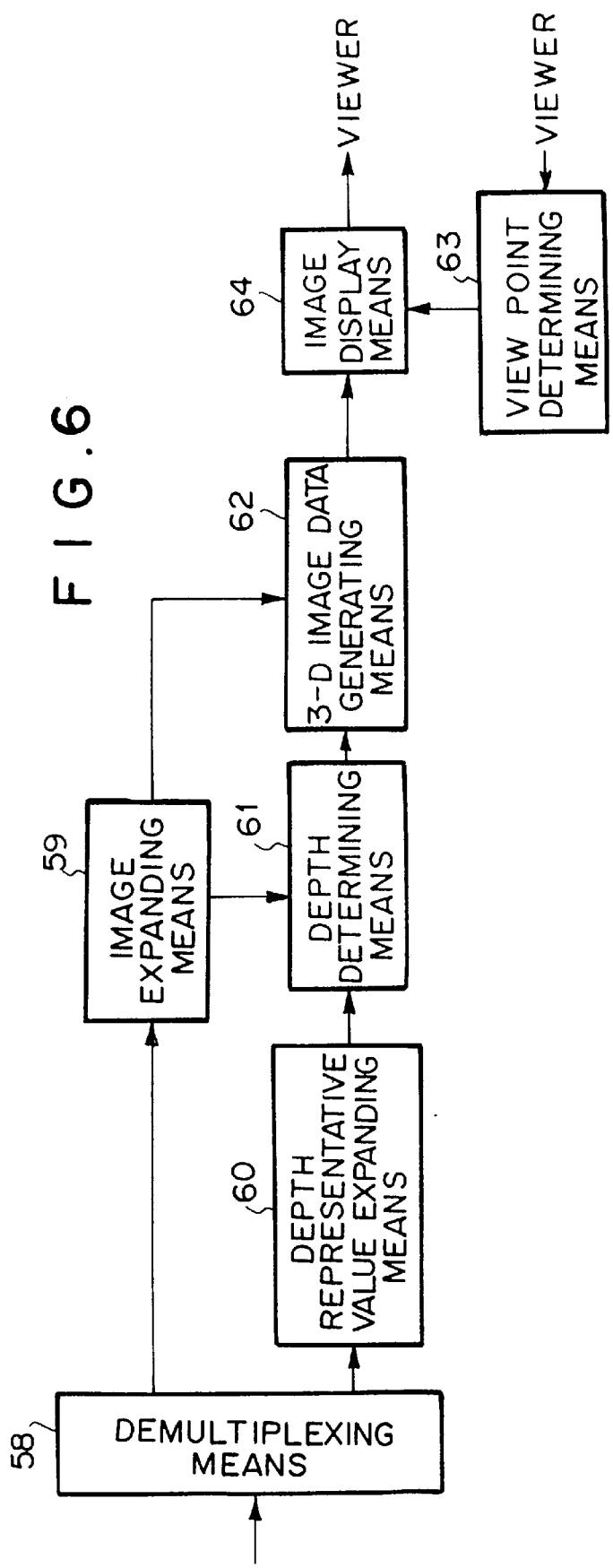
FIG. 6 is a block diagram showing a three-dimensional image decoding system according to a sixth embodiment of the present invention.

FIG. 6 shows a decoding system according to a sixth embodiment of the present invention. Demultiplexing means 58 multiplexes and separates a compression stream to separate the compressed data of the pickup image and the compressed data of depth representative values from each other. Image expanding means 59 expands the compressed data of the pickup image supplied from the demultiplexing means 58. Depth representative value expanding means 60 expands the compressed data of depth representative values which are supplied from the demultiplexing means 58.

Depth determining means 61 calculates the depth values of the image from which the depth values are thinned out, on the basis of the depth representative value expanding means 60 by using the area maps supplied from the image expanding means 59. Specifically, when the depth values of peripheral pixels is calculated by the interpolative calculation of the depth representative values, with respect to the areas which are defined as belonging to the same object on the basis of the area maps, the depth value of each pixel is determined by the interpolative calculation of the depth representative values, and with respect to the areas which are defined as belonging to different objects, the depth value of each pixel is determined by the interpolative calculation which does not use the depth representative values belonging to different areas.

Three-dimensional image data generating means 62 generates three-dimensional image data by using the decoded image supplied from the image expanding means 59 and the pixel-basis depth values which are supplied from the depth determining means 61. View-point determining means 63 determines a view point of a viewer to the three-dimensional image data supplied from the three-dimensional image data generating means 24 in accordance with an instruction from the viewer. A pointing device such as a mouse or the like, keys of a keyboard, a joy stick for games or the like may be used as a means for the viewer's instruction. Image display means 64 performs a geometrical transformation on the three-dimensional image data supplied from the three-dimensional image data generating means 62 to show the result data to the viewer through a display medium.

The image expanding means 59 and the depth determining means 61 which are somewhat complicated in construction will be described hereunder. The construction of each of the depth representative value expanding means 60, the three-dimensional image data generating means 62, the view-point determining means 63 and the image display means 64 are the same as the second embodiment.

Figure 18:
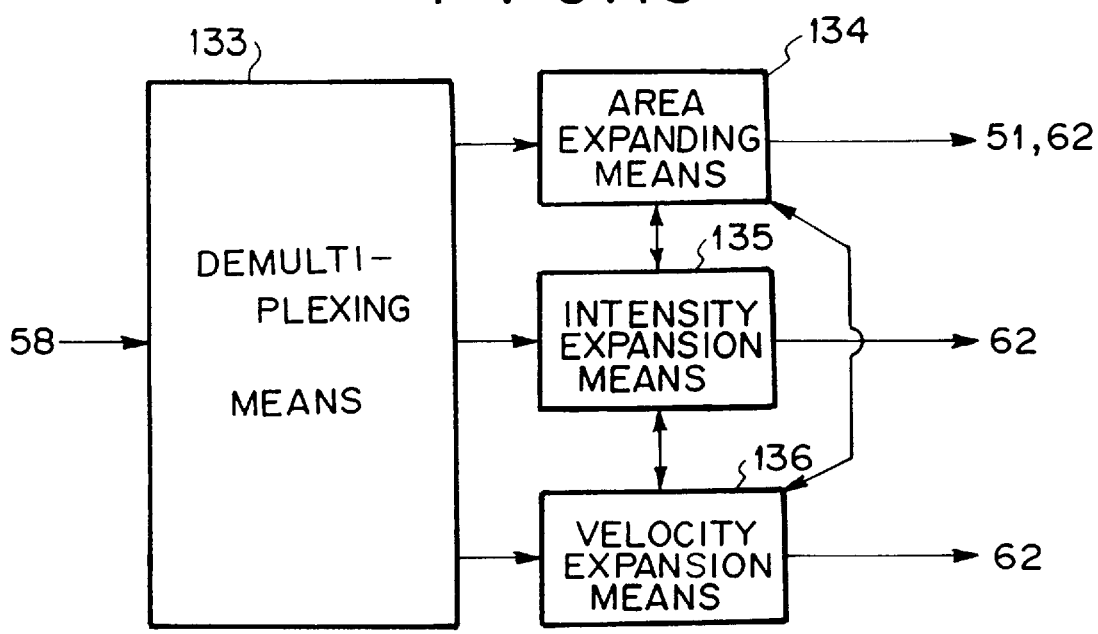
FIG. 18 is a block diagram showing the construction of image expanding means 59.

FIG. 18 shows the construction of the image expanding means 59. Demultiplexing means 133 further separates the compressed data of the pickup image supplied from the demultiplexing means 58 into area compressed data, intensity (color brightness) compressed data and velocity compressed data. Area expanding means 134 expands the compressed data of the area dividing information, and outputs the result to the depth determining means 61 and the three-dimensional image data generating means 62. Intensity (color brightness) expanding means 135 expands the intensity compressed data, and outputs the expanded data to the three-dimensional image data generating means 62.

Velocity expanding means 136 expands the velocity compressed data, and outputs the expanded data to the three-dimensional image data generating means 62. H.261, H.263, MPEG1, MPEG2, etc. which are known as international standard systems for moving picture signals may be applied to the intensity expanding means 135 and the velocity expanding means 136. Further, when area expanding means 134 is contained, MPEG4 known as an international standard system for moving picture signals which is under consideration may be applied. That is, the area expanding means 134, the intensity expanding means 135 and the velocity expanding means 136 perform the expansion of the compressed data while mutually exchanging the data to one another.

Figure 19:
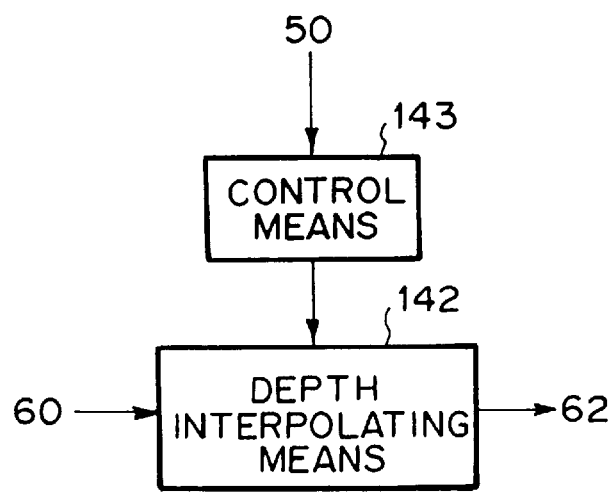
FIG. 19 is a block diagram showing the construction of depth determining means 61.

FIG. 19 shows the construction of the depth determining means 61. According to interpolation information supplied from a control circuit 143, depth interpolating means 141 interpolates depth values for the image which is thinned out, and outputs the interpolated depth values to the three-dimensional image data generating means 62. Control means 142 determines an interpolative calculation to be performed in the depth interpolating means 142.

Figure 7:
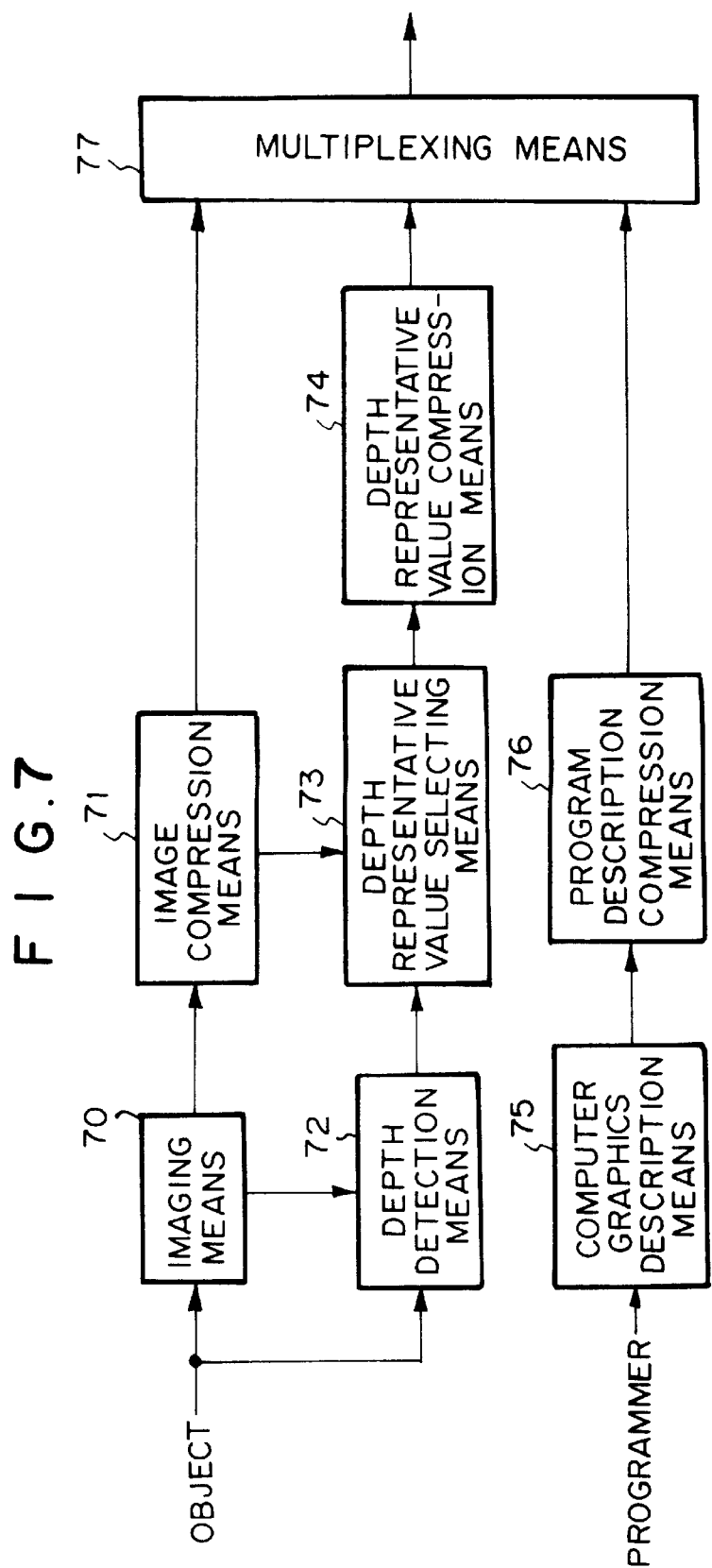
FIG. 7 is a block diagram showing a three-dimensional image encoding system according to a seventh embodiment of the present invention.

FIG. 7 shows a encoding system according to a seventh embodiment of the present invention.

In FIG. 7, imaging means 70 picks up an image of an object to be viewed, and image compression means 71 compresses an image signal supplied from the imaging means 70. Specifically, intensity (color brightness) maps, area maps and velocity maps are generated from a pickup image, and then compressed. Alternatively, as in the case of the ordinary image coding system, the intensity maps and the velocity maps are generated, and then compressed. Further, the depth of the object to be viewed is detected by depth detection means 72 to generate pixel-basis depth maps corresponding to the pickup image. Depth representative value selection means 73 thins out the depth maps obtained by the depth detection means 72 by using the area maps supplied from the image compression means 71. Specifically, the depth value of a pixel at the center point of an area instructed by a given area map is sampled, the depth value of a pixel at the boundary portion of adjacent areas is sampled, and the like.

Depth representative value compression means 74 compresses the depth representative values which are supplied from the depth representative value selection means 73. Specifically, a set of depth representative values is regarded as an image, and an ordinary image encoding system is applied to the image.

Computer graphics description means 75 describes computer graphics in accordance with a predetermined syntax. Program description compression means 76 compresses the program description of the computer graphics supplied from the computer graphics description means 75. Specifically, there is used a tool such as gzip which is frequently used as a compression means for computer data. Multiplexing means 77 multiplexes the compression data which are supplied from the image compression means 71, the depth representative value compression means 74 and the program description compression means 76, and transmits or stores the multiplexed data as a compression stream.

The construction of each of the imaging means 70, the image compression means 71, the depth detection means 72, the depth representative value selection means 73 and the depth representative value compression means 74 is the same as the fifth embodiment.

Figure 8:
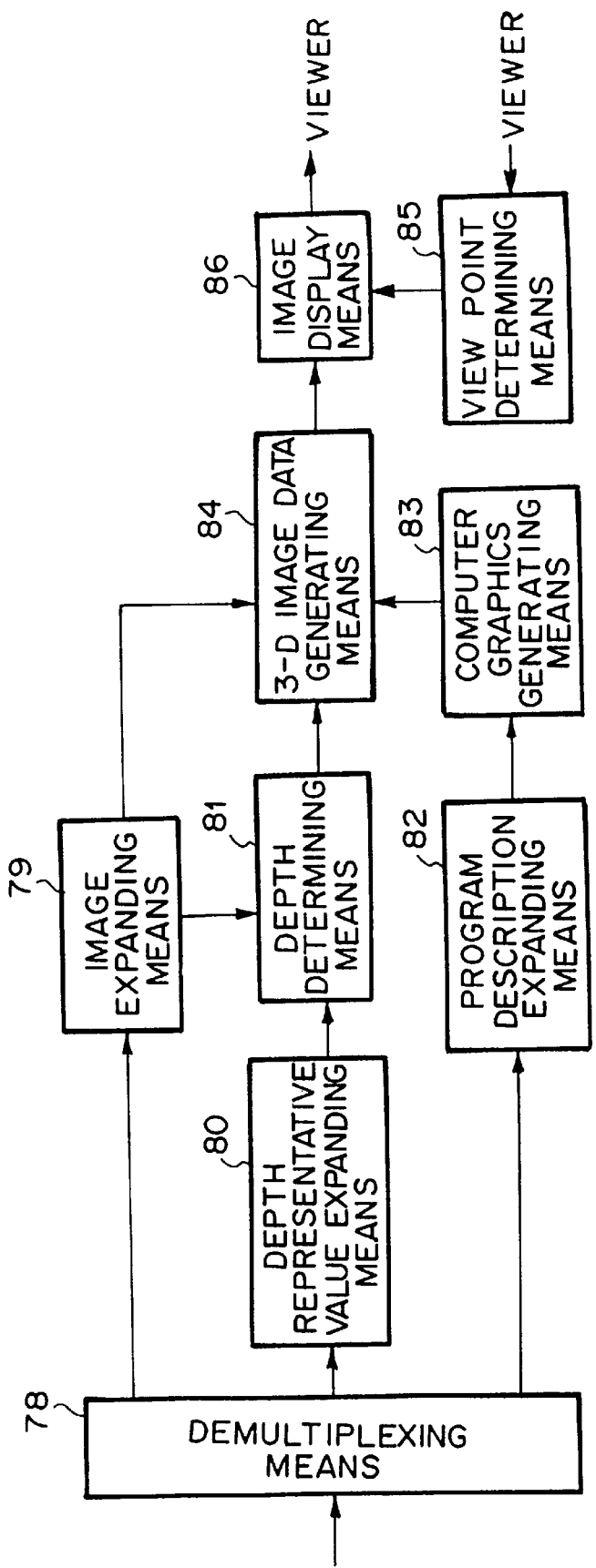
FIG. 8 is a block diagram showing a three-dimensional image decoding system according to an eighth embodiment of the present invention.

FIG. 8 shows a decoding system according to an eighth embodiment of the present invention.

Demultiplexing means 78 multiplexes and separates the -compression stream to separate the compressed data of the pickup image, the compressed data of the depth representative values and the compressed data of the program description of the computer graphics from one another. Image expanding means 79 expands the compressed data of the pickup image supplied from the demultiplexing means 78. Depth representative value expanding means 80 expands the compressed data of depth representative values which are supplied from the demultiplexing means 78. Depth determining means 81 calculates the depth values for an image from which the depth values are thinned out, on the basis of the depth representative values supplied from the depth representative value expanding means 80 by using the area maps given from the image expanding means 79. Specifically, when the depth values of peripheral pixels are calculated by the interpolative calculation of the depth representative values, with respect to the areas which are defined as belong to the same object by the area maps, the depth value of each pixel is determined by the interpolative calculation of the depth representative values, and with respect to the areas which are defined as belonging to different objects, the depth value of each pixel is determined by the interpolative calculation which does not use the representative values belonging to different areas.

Program description expanding means 82 expands the compressed data of the program description of the computer graphics which are supplied from the demultiplexing means 78. Computer graphics generating means 83 generates computer graphics by using the program description of the computer graphics which is supplied from the program description expanding means 82. The computer graphics data generally comprise coordinate values of three-dimensional shape, intensity (color brightness) values, etc. Three-dimensional image data generating means 84 generates three-dimensional image data comprising a composition of a natural image and computer graphics by using the decoded image supplied from the image expanding means 79, the pixel-basis depth values supplied from the depth determining means 81 and the computer graphics data supplied from the computer graphics generating means 83.

View point determining means 85 determines a view point of a viewer to the three-dimensional image data supplied from the three-dimensional image data generating means 84 in accordance with an instruction from the viewer. A pointing device such as a mouse or the like, keys of a keyboard, a joy stick for games or the like may be used to input the viewer's instruction. Image display means 86 performs a geometrical transformation on the three-dimensional image data supplied from the three-dimensional image data generating means 84 in accordance with the view point of the viewer is supplied from the view point determining means 85 to show the final data to the viewer through a display medium.

The construction of each of the image expanding means 79, the depth representative value expanding means 80, the depth determining means 81, the three-dimensional image data generating means 84, the view point determining means 85 and the image display means 86 are the same as the sixth embodiment.

As described above, according to the present invention, there can be achieved a three-dimensional image encoding/decoding system for implementing the composition of a natural image and computer graphics while performing efficient data compression.

Although the present invention has been shown and described with respect to best mode embodiments thereof, it should be understood by those skilled in the art that the foregoing and various other changes, omission, and addition in the form and detail thereof may made therein without departing from the spirit and scope of the present invention.

What is claimed is:

1. A three-dimensional image encoding system comprising:

imaging means for picking up an image of an object by a mono-view-point or multi-view-point imaging system;

image compression means for compressing the pickup image obtained by said imaging means;

depth detection means for detecting the depth of the object by different imaging system from said view-point imaging-system;

depth representative value selecting means for selecting depth representative values obtained by sampling the depth of the object through a predetermined pattern so as to be regarded as an image; depth representative value compression means for compressing the depth representative values obtained by said depth representative value selecting means; and multiplexing means for multiplexing compressed data which are obtained by said image compression means and said depth representative value compressing means.

2. A three-dimensional image encoding system comprising:

imaging means for picking up an image of an object by a mono-view-point or multi-view-point imaging system;

image compression means for compressing the pickup image;

depth detection means for detecting the depth of the object by different imaging system from said imaging system;

depth representative value selecting means for selecting depth representative values obtained by sampling the depth of the object through a predetermined pattern so as to be regarded as an image;

depth representative value compression means for compressing the depth representative values; and multiplexing means for multiplexing compressed data which are obtained by said image compression means and said depth representative value compressing means, wherein said image compression means comprises:
intensity compression means for compressing the intensity information of an input image signal; and
velocity compression means for compressing motion information of the input image signal.

3. A three-dimensional image encoding system comprising:

imaging means for picking up an image of an object by a mono-view-point or multi-view-point imaging system;

image compression means for compressing the pickup image;

depth detection means for detecting the depth of the object by different imaging system from said imaging system;

depth representative value selecting means for selecting depth representative values obtained by sampling the depth of the object through a predetermined pattern so as to be regarded as an image;

depth representative value compression means for compressing the depth representative values; and multiplexing means for multiplexing compressed data which are obtained by said image compression means and said depth representative value compressing means, wherein said depth detection means comprises:
second imaging means for picking up an image of the object from a position which is horizontally different from the position of said imaging means;
disparity detection means for detecting the disparity between the images obtained by said second imaging means and said imaging means;
camera parameter measurement means for measuring camera parameters;
depth calculation means for calculating depth data with the disparity data of on-pixel-basis which are supplied from said disparity detection means and the camera parameters which are supplied from said camera parameter measurement means; and
means for outputting the calculation result to said depth representative value selection means.

4. A three-dimensional image encoding system comprising:

imaging means for picking up an image of an object by a mono-view-point or multi-view-point imaging system;

image compression means for compressing the pickup image;

depth detection means for detecting the depth of the object by different imaging system from said imaging system;

depth representative value selecting means for selecting depth representative values obtained by sampling the depth of the object through a predetermined pattern so as to be regarded as an image;

depth representative value compression means for compressing the depth representative values; and multiplexing means for multiplexing compressed data which are obtained by said image compression means and said depth representative value compressing means, wherein said depth representative value selecting means comprises:
depth sampling means for sampling depth data in accordance with a sampling pattern which is supplied from control means, said control means supplying a predetermined sampling pattern to said depth sampling means.

5. The three-dimensional image encoding system as set forth in claim 4, wherein the sampling pattern is thinned out each of one dot and one line from a whole pattern.

6. The three-dimensional image encoding system as set forth in claim 4, wherein the sampling pattern is picked up one point in a block of the whole pattern.

7. A three-dimensional image decoding system comprising:

data separating means for separating compressed data obtained by multiplexing compressed image information and compressed depth representative values;

image expanding means for expanding the separated image compressed data obtained by said data separating means;

depth representative value expanding means for expanding the separated depth representative value compressed data obtained by said data separating means;

depth determining means for determining the depth of each pixel unit from the expanded depth representative values;

three-dimensional image data generating means for generating three-dimensional image data by using the expanded pickup image and the depth of the pixel unit;

view-point determining means for determining a view point in accordance with an instruction from a viewer; and display means for displaying an image according to the three-dimensional image data and the view-point information.

8. A three-dimensional image decoding system comprising:

data separating means for separating compressed data obtained by multiplexing compressed image information and compressed depth representative values;

image expanding means for expanding the separated image compressed data;

depth representative value expanding means for expanding the separated depth representative value compressed data;

depth determining means for determining the depth of each pixel unit from the expanded depth representative values;

three-dimensional image data generating means for generating three-dimensional image data by using the expanded pickup image and the depth of the pixel unit;

view-point determining means for determining a view point in accordance with an instruction from a viewer; and display means for displaying an image according to the three-dimensional image data and the view-point information, wherein said image expanding means comprises:
- demultiplexing means for further separating the compressed data of a pickup image given from a demultiplexing means into a compressed data of intensity and a compressed data of velocity;
- intensity expanding means for expanding the compressed data of intensity, and outputting the expanded data to three-dimensional image data generating means; and
- velocity expanding means for expanding the compressed data of velocity, and outputting the expanded data to the three-dimensional image data generating means.

9. A three-dimensional image decoding system comprising:
- data separating means for separating compressed data obtained by multiplexing compressed image information and compressed depth representative values;
- image expanding means for expanding the separated image compressed data;
- depth representative value expanding means for expanding the separated depth representative value compressed data;
- depth determining means for determining the depth of each pixel unit from the expanded depth representative values;
- three-dimensional image data generating means for generating three-dimensional image data by using the expanded pickup image and the depth of the pixel unit;
- view-point determining means for determining a view point in accordance with an instruction from a viewer; and
- display means for displaying an image according to the three-dimensional image data and the view-point information, wherein said depth determining means comprises:
- depth interpolating means for interpolating the depth values corresponding to the image which is thinned out, and outputting the result depth values to the three-dimensional image data generating means; and
- control means for determining an interpolative calculation to be performed by said depth interpolating means in consideration of a predetermined sampling pattern.

10. A three-dimensional image decoding system comprising:
- data separating means for separating compressed data obtained by multiplexing compressed image information and compressed depth representative values;
- image expanding means for expanding the separated image compressed data;
- depth representative value expanding means for expanding the separated depth representative value compressed data;
- depth determining means for determining the depth of each pixel unit from the expanded depth representative values;
- three-dimensional image data generating means for generating three-dimensional image data by using the expanded pickup image and the depth of the pixel unit;
- view-point determining means for determining a view point in accordance with an instruction from a viewer; and
- display means for displaying an image according to the three-dimensional image data and the view-point information, wherein said display means comprises:
- projection image generating means for generating a projection image of three-dimensional image data which is viewed from a view point of the viewer on the basis of the three-dimensional data of an image supplied from said three-dimensional image data generating means and a view-point data of the viewer which is supplied from the view-point determining means, and outputting the projection image to a display; and
- the display for providing the viewer with the projection image given from the projection image generating means by using an image display device.

11. A three-dimensional image encoding system comprising:
- imaging means for picking up an image of an object by a mono-view-point or multi-view-point imaging system;
- image compression means for compressing the pickup image obtained by said imaging means;
- depth detection means for detecting the depth of the object by different imaging system from said view-point imaging system;
- depth representative value selecting means for selecting depth representative values obtained by sampling the depth of the object through a predetermined pattern so as to be regarded as an image;
- depth representative value compressing means for compressing the depth representative values obtained by said depth representative value selecting means;
- program description means for performing a program description on computer graphics;
- program description compression means for compressing the program description; and
- compressed data multiplexing means for multiplexing compressed data which are given from said image compression means, said depth representative value compressing means and said program description compression means.

12. A three-dimensional image encoding system comprising:
- imaging means for picking up an image of an object by a mono-view-point or multi-view-point imaging system;
- image compression means for compressing the pickup image;
- depth detection means for detecting the depth of the object by different imaging system from said imaging system;
- depth representative value selecting means for selecting depth representative values obtained by sampling the depth of the object through a predetermined pattern so as to be regarded as an image;
- depth representative value compressing means for compressing the depth representative values;
- program description means for performing a program description on computer graphics;
- program description compression means for compressing the program description; and
- compressed data multiplexing means for multiplexing compressed data which are given from said image compression means, said depth representative value compressing means and said program description compression means, wherein said image compression means comprises:
- intensity compression means for compressing the intensity information of an input image signal; and velocity compression means for compressing motion information of the input image signal.

13. A three-dimensional image encoding system comprising:
- imaging means for picking up an image of an object by a mono-view-point or multi-view-point imaging system;
- image compression means for compressing the pickup image;
- depth detection means for detecting the depth of the object by different imaging system from said imaging system;
- depth representative value selecting means for selecting depth representative values obtained by sampling the depth of the object through a predetermined pattern so as to be regarded as an image;
- depth representative value compressing means for compressing the depth representative values;
- program description means for performing a program description on computer graphics;
- program description compression means for compressing the program description; and
- compressed data multiplexing means for multiplexing compressed data which are given from said image compression means, said depth representative value compressing means and said program description compression means,
- wherein said depth detection means comprises:
  - second imaging means for picking up an image of the object from a position which is horizontally different from the position of said imaging means;
  - disparity detection means for detecting the disparity between the images obtained by said second imaging means and said imaging means;
  - camera parameter measurement means for measuring camera parameters;
  - depth calculation means for calculating depth data with the disparity data of on-pixel-basis which are supplied from said disparity detection means and the camera parameters which are supplied from said camera parameter measurement means; and
  - means for outputting the calculation result to said depth representative value selection means.

14. A three-dimensional image encoding system comprising:
- imaging means for picking up an image of an object by a mono-view-point or multi-view-point imaging system;
- image compression means for compressing the pickup image;
- depth detection means for detecting the depth of the object by different imaging system from said imaging system;
- depth representative value selecting means for selecting depth representative values obtained by sampling the depth of the object through a predetermined pattern so as to be regarded as an image;
- depth representative value compressing means for compressing the depth representative values;
- program description means for performing a program description on computer graphics;
- program description compression means for compressing the program description; and
- compressed data multiplexing means for multiplexing compressed data which are given from said image compression means, said depth representative value compressing means and said program description compression means,
- wherein said depth representative value selecting means comprises:
  - depth sampling means for sampling depth data in accordance with a sampling pattern which is supplied from control means, said control means supplying a predetermined sampling pattern to said depth sampling means.

15. The three-dimensional image encoding system as set forth in claim 14,
- wherein the sampling pattern is thinned out each of one dot and one line from a whole pattern.

16. The three-dimensional image encoding system as set forth in claim 14,
- wherein the sampling pattern is picked up one point in a block of the whole pattern.

17. A three-dimensional image decoding system comprising:
- separating means for separating compressed data which are obtained by multiplexing compressed image information, compressed depth representative values and compressed program description;
- image data expanding means for expanding the separated image compressed data obtained from said separating means;
- depth representative value expanding means for expanding the separated depth representative value compressed data obtained from said separating means;
- depth determining means for determining the depth of each pixel unit from the expanded depth representative values by using an area map from said image data expanding means;
- program description expanding means for expanding the compressed data of the separated program description;
- computer graphics generating means for generating computer graphics from the expanded program description;
- three-dimensional image data generating means for generating three-dimensional image data by using the expanded pickup image, the depth of the pixel unit and the generated computer graphics;
- view-point determining means for determining a view point in accordance with an instruction from a viewer; and
- display means for performing an image display in accordance with the three-dimensional image data and the view-point information.

18. A three-dimensional image decoding system comprising:
- separating means for separating compressed data which are obtained by multiplexing compressed image information, compressed depth representative values and compressed program description;
- image data expanding means for expanding the separated image compressed data;
- depth representative value expanding means for expanding the separated depth representative value compressed data;
- depth determining means for determining the depth of each pixel unit from the expanded depth representative values;
- program description expanding means for expanding the compressed data of the separated program description;
- computer graphics generating means for generating computer graphics from the expanded program description;

three-dimensional image data generating means for generating three-dimensional image data by using the expanded pickup image, the depth of the pixel unit and the generated computer graphics;

view-point determining means for determining a view point in accordance with an instruction from a viewer; and display means for performing an image display in accordance with the three-dimensional image data and the view-point information, wherein said image expanding means comprises:

demultiplexing means for further separating the compressed data of a pickup image given from a demultiplexing means into a compressed data of intensity and a compressed data of velocity;

intensity expanding means for expanding the compressed data of intensity, and outputting the expanded data to three-dimensional image data generating means; and velocity expanding means for expanding the compressed data of velocity, and outputting the expanded data to the three-dimensional image data generating means.

19. A three-dimensional image decoding system comprising:

separating means for separating compressed data which are obtained by multiplexing compressed image information, compressed depth representative values and compressed program description;

image data expanding means for expanding the separated image compressed data;

depth representative value expanding means for expanding the separated depth representative value compressed data;

depth determining means for determining the depth of each pixel unit from the expanded depth representative values;

program description expanding means for expanding the compressed data of the separated program description;

computer graphics generating means for generating computer graphics from the expanded program description;

three-dimensional image data generating means for generating three-dimensional image data by using the expanded pickup image, the depth of the pixel unit and the generated computer graphics;

view-point determining means for determining a view point in accordance with an instruction from a viewer; and display means for performing an image display in accordance with the three-dimensional image data and the view-point information, wherein said depth determining means comprises:

depth interpolating means for interpolating the depth values corresponding to the image which is thinned out, and outputting the result depth values to the three-dimensional image data generating means; and control means for determining an interpolative calculation to be performed by said depth interpolating means in consideration of a predetermined sampling pattern.

20. A three-dimensional image decoding system comprising:

separating means for separating compressed data which are obtained by multiplexing compressed image information, compressed depth representative values and compressed program description;

image data expanding means for expanding the separated image compressed data;

depth representative value expanding means for expanding the separated depth representative value compressed data;

depth determining means for determining the depth of each pixel unit from the expanded depth representative values;

program description expanding means for expanding the compressed data of the separated program description;

computer graphics generating means for generating computer graphics from the expanded program description;

three-dimensional image data generating means for generating three-dimensional image data by using the expanded pickup image, the depth of the pixel unit and the generated computer graphics;

view-point determining means for determining a view point in accordance with an instruction from a viewer; and display means for performing an image display in accordance with the three-dimensional image data and the view-point information, wherein said display means comprises:

projection image generating means for generating a projection image of three-dimensional image data which is viewed from a view point of the viewer on the basis of the three-dimensional data of an image supplied from said three-dimensional image data generating means and a view-point data of the viewer which is supplied from the view-point determining means, and outputting the projection image to a display; and the display for providing the viewer with the projection image given from the projection image generating means by using an image display device.

21. A three-dimensional image encoding system comprising:

imaging means for picking up an image of an object by a mono-view-point or multi-view-point imaging system;

image compression means for compressing the pickup image and compressing and outputting area dividing information of the pickup image from said imaging means;

depth detection means for detecting the depth of the object by different imaging system from said view-point imaging system;

depth representative value selecting means for selecting depth representative values by using the area dividing information which is provided from said image compression means, said depth representative values being obtained by sampling the depth of the object through a predetermined pattern so as to be regarded as an image;

depth representative value compressing means for compressing the depth representative values obtained by said depth representative value selecting means; and multiplexing means for multiplexing the compressed data which are provided from said image compression means and said depth representative value compressing means.

22. A three-dimensional image encoding system comprising:

imaging means for picking up an image of an object by a mono-view-point or multi-view-point imaging system;

image compression means for compressing the pickup image and compressing and outputting area dividing information of the pickup image;

depth detection means for detecting the depth of the object by different imaging system from said imaging system;

depth representative value selecting means for selecting depth representative values by using the area dividing information which is provided from said image compression means, said depth representative values being obtained by sampling the depth of the object through a predetermined pattern so as to be regarded as an image;

depth representative value compressing means for compressing the depth representative values; and multiplexing means for multiplexing the compressed data which are provided from said image compression means and said depth representative value compressing means, wherein said image compression means comprises:
intensity compression means for compressing the intensity information of an input image signal; and
velocity compression means for compressing motion information of the input image signal.

23. A three-dimensional image encoding system comprising:

imaging means for picking up an image of an object by a mono-view-point or multi-view-point imaging system;

image compression means for compressing the pickup image and compressing and outputting area dividing information of the pickup image;

depth detection means for detecting the depth of the object by different imaging system from said imaging system;

depth representative value selecting means for selecting depth representative values by using the area dividing information which is provided from said image compression means, said depth representative values being obtained by sampling the depth of the object through a predetermined pattern so as to be regarded as an image;

depth representative value compressing means for compressing the depth representative values; and multiplexing means for multiplexing the compressed data which are provided from said image compression means and said depth representative value compressing means, wherein said depth detection means comprises:
second imaging means for picking up an image of the object from a position which is horizontally different from the position of said imaging means;
disparity detection means for detecting the disparity between the images obtained by said second imaging means and said imaging means;
camera parameter measurement means for measuring camera parameters;
depth calculation means for calculating depth data with the disparity data of on-pixel-basis which are supplied from said disparity detection means and the camera parameters which are supplied from said camera parameter measurement means; and
means for outputting the calculation result to said depth representative value selection means.

24. A three-dimensional image encoding system comprising:

imaging means for picking up an image of an object by a mono-view-point or multi-view-point imaging system;

image compression means for compressing the pickup image and compressing and outputting area dividing information of the pickup image;

depth detection means for detecting the depth of the object by different imaging system from said imaging system;

depth representative value selecting means for selecting depth representative values by using the area dividing information which is provided from said image compression means, said depth representative values being obtained by sampling the depth of the object through a predetermined pattern so as to be regarded as an image;

depth representative value compressing means for compressing the depth representative values; and multiplexing means for multiplexing the compressed data which are provided from said image compression means and said depth representative value compressing means, wherein said depth representative value selecting means comprises:
depth sampling means for sampling depth data in accordance with a sampling pattern which is supplied from control means, said control means supplying a predetermined sampling pattern to said depth sampling means.

25. The three-dimensional image encoding system as set forth in claim 24,
wherein the sampling pattern is thinned out each of one dot and one line from a whole pattern.

26. The three-dimensional image encoding system as set forth in claim 24,
wherein the sampling pattern is picked up one point in a block of the whole pattern.

27. A three-dimensional image decoding system comprising:

compressed data separating means for separating compressed data which are obtained by multiplexing compressed image information and compressed depth representative values;

image expanding means for expanding the separated image compressed data obtained by said compressed data separating means;

depth representative value expanding means for expanding the separated depth representative value compressed data;

depth determining means for determining the depth of each pixel unit from the expanded depth representative values by using area dividing information which is provided from said image expanding means;

three-dimensional image data generating means for generating three-dimensional image data by using the expanded pickup image and the depth of the pixel unit;

view-point determining means for determining a view point in accordance with an instruction from a viewer; and display means for performing an image display according to the three-dimensional image data and the view-point information.

28. A three-dimensional image decoding system comprising:

compressed data separating means for separating compressed data which are obtained by multiplexing compressed image information and compressed depth representative values;

image expanding means for expanding the separated image compressed data;

depth representative value expanding means for expanding the separated depth representative value compressed data;

depth determining means for determining the depth of each pixel unit from the expanded depth representative values by using area dividing information which is provided from said image expanding means;

three-dimensional image data generating means for generating three-dimensional image data by using the expanded pickup image and the depth of the pixel unit;

view-point determining means for determining a view point in accordance with an instruction from a viewer; and display means for performing an image display according to the three-dimensional image data and the view-point information, wherein said image expanding means comprises:
  demultiplexing means for further separating the compressed data of a pickup image given from a demultiplexing means into a compressed data of intensity and a compressed data of velocity;
  intensity expanding means for expanding the compressed data of intensity, and outputting the expanded data to three-dimensional image data generating means; and
  velocity expanding means for expanding the compressed data of velocity, and outputting the expanded data to the three-dimensional image data generating means.

29. A three-dimensional image decoding system comprising:

compressed data separating means for separating compressed data which are obtained by multiplexing compressed image information and compressed depth representative values;

image expanding means for expanding the separated image compressed data;

depth representative value expanding means for expanding the separated depth representative value compressed data;

depth determining means for determining the depth of each pixel unit from the expanded depth representative values by using area dividing information which is provided from said image expanding means;

three-dimensional image data generating means for generating three-dimensional image data by using the expanded pickup image and the depth of the pixel unit;

view-point determining means for determining a view point in accordance with an instruction from a viewer; and display means for performing an image display according to the three-dimensional image data and the view-point information, wherein said depth determining means comprises:
  depth interpolating means for interpolating the depth values corresponding to the image which is thinned out, and outputting the result depth values to the three-dimensional image data generating means; and
  control means for determining an interpolative calculation to be performed by said depth interpolating means in consideration of a predetermined sampling pattern.

30. A three-dimensional image decoding system comprising:

compressed data separating means for separating compressed data which are obtained by multiplexing compressed image information and compressed depth representative values;

image expanding means for expanding the separated image compressed data;

depth representative value expanding means for expanding the separated depth representative value compressed data;

depth determining means for determining the depth of each pixel unit from the expanded depth representative values by using area dividing information which is provided from said image expanding means;

three-dimensional image data generating means for generating three-dimensional image data by using the expanded pickup image and the depth of the pixel unit;

view-point determining means for determining a view point in accordance with an instruction from a viewer; and display means for performing an image display according to the three-dimensional image data and the view-point information, wherein said display means comprises:
  projection image generating means for generating a projection image of three-dimensional image data which is viewed from a view point of the viewer on the basis of the three-dimensional data of an image supplied from said three-dimensional image data generating means and a view-point data of the viewer which is supplied from the view-point determining means, and outputting the projection image to a display; and
  the display for providing the viewer with the projection image given from the projection image generating means by using an image display device.

31. A three-dimensional image encoding system comprising:

imaging means for picking up an image of an object by a mono-view-point or multi-view-point imaging system;

image compression means for compressing the pickup image and compressing and outputting area dividing information of the pickup image obtained by said imaging means;

depth detection means for detecting the depth of the object by different imaging system from said view-point imaging system;

depth representative value selecting means for selecting depth representative values by using the area dividing information provided from said image compression means, said depth representative values being obtained by sampling the depth of the object through a predetermined pattern so as to be regarded as an image;

depth representative value compressing means for compressing the depth representative values obtained by said depth representative value selecting means;

program description means for performing a program description on computer graphics;

program description compression means for compressing the program description; and multiplexing means for multiplexing the compressed data which are provided from said image compression means, said depth representative value compressing means and said program description compressing means.

32. A three-dimensional image encoding system comprising:

imaging means for picking up an image of an object by a mono-view-point or multi-view-point imaging system;

image compression means for compressing the pickup image and compressing and outputting area dividing information of the pickup image;

depth detection means for detecting the depth of the object by different imaging system from said imaging system;

depth representative value selecting means for selecting depth representative values by using the area dividing information provided from said image compression means, said depth representative values being obtained by sampling the depth of the object through a predetermined pattern so as to be regarded as an image;

depth representative value compressing means for compressing the depth representative values;

program description means for performing a program description on computer graphics;

program description compression means for compressing the program description; and multiplexing means for multiplexing the compressed data which are provided from said image compression means, said depth representative value compressing means and said program description compressing means, wherein said image compression means comprises:
intensity compression means for compressing the intensity information of an input image signal; and
velocity compression means for compressing motion information of the input image signal.

33. A three-dimensional image encoding system comprising:

imaging means for picking up an image of an object by a mono-view-point or multi-view-point imaging system;

image compression means for compressing the pickup image and compressing and outputting area dividing information of the pickup image;

depth detection means for detecting the depth of the object by different imaging system from said imaging system;

depth representative value selecting means for selecting depth representative values by using the area dividing information provided from said image compression means, said depth representative values being obtained by sampling the depth of the object through a predetermined pattern so as to be regarded as an image;

depth representative value compressing means for compressing the depth representative values;

program description means for performing a program description on computer graphics;

program description compression means for compressing the program description; and multiplexing means for multiplexing the compressed data which are provided from said image compression means, said depth representative value compressing means and said program description compressing means, wherein said depth detection means comprises:
second imaging means for picking up an image of the object from a position which is horizontally different from the position of said imaging means;
disparity detection means for detecting the disparity between the images obtained by said second imaging means and said imaging means;
camera parameter measurement means for measuring camera parameters;

depth calculation means for calculating depth data with the disparity data of on-pixel-basis which are supplied from said disparity detection means and the camera parameters which are supplied from said camera parameter measurement means; and
means for outputting the calculation result to said depth representative value selection means.

34. A three-dimensional image encoding system comprising:

imaging means for picking up an image of an object by a mono-view-point or multi-view-point imaging system;

image compression means for compressing the pickup image and compressing and outputting area dividing information of the pickup image;

depth detection means for detecting the depth of the object by different imaging system from said imaging system;

depth representative value selecting means for selecting depth representative values by using the area dividing information provided from said image compression means, said depth representative values being obtained by sampling the depth of the object through a predetermined pattern so as to be regarded as an image;

depth representative value compressing means for compressing the depth representative values;

program description means for performing a program description on computer graphics;

program description compression means for compressing the program description; and multiplexing means for multiplexing the compressed data which are provided from said image compression means, said depth representative value compressing means and said program description compressing means, wherein said depth representative value selecting means comprises:
depth sampling means for sampling depth data in accordance with a sampling pattern which is supplied from control means, said control means supplying a predetermined sampling pattern to said depth sampling means.

35. The three-dimensional image encoding system as set forth in claim 34,
wherein the sampling pattern is thinned out each of one dot and one line from a whole pattern.

36. The three-dimensional image encoding system as set forth in claim 34,
wherein the sampling pattern is picked up one point in a block of the whole pattern.

37. A three-dimensional image decoding system comprising:

compressed data separating means for separating compressed data which are obtained by multiplexing compressed image information, compressed depth representative values and compressed program description;

image expanding means for expanding the separated image compressed data obtained by said compressed data separating means;

depth representative value expanding means for expanding the separated depth representative value compressed data obtained by said compressed data separating means;

depth determining means for determining the depth of each pixel unit from the expanded depth representative values by using area dividing information which is obtained from said image expanding means;

program description expanding means for expanding the compressed data of the separated program description;

computer graphics generating means for generating computer graphics from the expanded program description;

three-dimensional image data generating means for generating three-dimensional image data by using the expanded pickup image, the depth of the pixel unit and the generated computer graphics;

view-point determining means for determining a view point in accordance with an instruction from a viewer; and display means for performing an image display according to the three-dimensional image data and the view-point information.

38. A three-dimensional image decoding system comprising:

compressed data separating means for separating compressed data which are obtained by multiplexing compressed image information, compressed depth representative values and compressed program description;

image expanding means for expanding the separated image compressed data; depth representative value expanding means for expanding the separated depth representative value compressed data;

depth determining means for determining the depth of each pixel unit from the expanded depth representative values by using area dividing information which is obtained from said image expanding means;

program description expanding means for expanding the compressed data of the separated program description;

computer graphics generating means for generating computer graphics from the expanded program description;

three-dimensional image data generating means for generating three-dimensional image data by using the expanded pickup image, the depth of the pixel unit and the generated computer graphics;

view-point determining means for determining a view point in accordance with an instruction from a viewer; and display means for performing an image display according to the three-dimensional image data and the view-point information, wherein said image expanding means comprises:
   demultiplexing means for further separating the compressed data of a pickup image given from a demultiplexing means into a compressed data of intensity and a compressed data of velocity;
   intensity expanding means for expanding the compressed data of intensity, and outputting the expanded data to three-dimensional image data generating means; and
   velocity expanding means for expanding the compressed data of velocity, and outputting the expanded data to the three-dimensional image data generating means.

39. A three-dimensional image decoding system comprising:

compressed data separating means for separating compressed data which are obtained by multiplexing compressed image information, compressed depth representative values and compressed program description;

image expanding means for expanding the separated image compressed data;

depth representative value expanding means for expanding the separated depth representative value compressed data;

depth determining means for determining the depth of each pixel unit from the expanded depth representative values by using area dividing information which is obtained from said image expanding means;

program description expanding means for expanding the compressed data of the separated program description;

computer graphics generating means for generating computer graphics from the expanded program description;

three-dimensional image data generating means for generating three-dimensional image data by using the expanded pickup image, the depth of the pixel unit and the generated computer graphics;

view-point determining means for determining a view point in accordance with an instruction from a viewer; and display means for performing an image display according to the three-dimensional image data and the view-point information, wherein said depth determining means comprises:
   depth interpolating means for interpolating the depth values corresponding to the image which is thinned out, and outputting the result depth values to the three-dimensional image data generating means; and
   control means for determining an interpolative calculation to be performed by said depth interpolating means in consideration of a predetermined sampling pattern.

40. A three-dimensional image decoding system comprising:

compressed data separating means for separating compressed data which are obtained by multiplexing compressed image information, compressed depth representative values and compressed program description;

image expanding means for expanding the separated image compressed data;

depth representative value expanding means for expanding the separated depth representative value compressed data;

depth determining means for determining the depth of each pixel unit from the expanded depth representative values by using area dividing information which is obtained from said image expanding means;

program description expanding means for expanding the compressed data of the separated program description;

computer graphics generating means for generating computer graphics from the expanded program description;

three-dimensional image data generating means for generating three-dimensional image data by using the expanded pickup image, the depth of the pixel unit and the generated computer graphics;

view-point determining means for determining a view point in accordance with an instruction from a viewer; and display means for performing an image display according to the three-dimensional image data and the view-point information, wherein said display means comprises:
   projection image generating means for generating a projection image of three-dimensional image data which is viewed from a view point of the viewer on the basis of the three-dimensional data of an image supplied from said three-dimensional image data generating means and a view-point data of the viewer which is supplied from the view-point determining means, and outputting the projection image to a display; and the display for providing the viewer with the projection image given from the projection image generating means by using an image display device.

41. A three-dimensional image decoding system comprising:
- a data separator for separating compressed data obtained by multiplexing compressed image information and compressed depth representative values;
- an image expander for expanding the separated image compressed data obtained by said data separator;
- a depth representative value expander for expanding the separated depth representative value compressed data obtained by said data separator;
- a depth determiner for determining the depth of each pixel unit from the expanded depth representative values;
- a three-dimensional image data generator for generating three-dimensional image data by using the expanded pickup image and the depth of the pixel unit;
- a view-point determiner for determining a view point in accordance with an instruction from a viewer; and
- a display for displaying an image according to the three-dimensional image data and the view-point information.

42. A three-dimensional image decoding system comprising:
- a separator for separating compressed data which are obtained by multiplexing compressed image information, compressed depth representative values and compressed program description;
- an image data expander for expanding the separated image compressed data obtained from said separator;
- a depth representative value expander for expanding the separated depth representative value compressed data obtained from said separator;
- a depth determiner for determining the depth of each pixel unit from the expanded depth representative values by using an area map from said image data expander;
- a program description expander for expanding the compressed data of the separated program description;
- a computer graphics generator for generating computer graphics from the expanded program description;
- a three-dimensional image data generator for generating three-dimensional image data by using the expanded pickup image, the depth of the pixel unit and the generated computer graphics;
- a view-point determiner for determining a view point in accordance with an instruction from a viewer; and
- a display for performing an image display in accordance with the three-dimensional image data and the view-point information.

43. A three-dimensional image decoding system comprising:
- a compressed data separator for separating compressed data which are obtained by multiplexing compressed image information and compressed depth representative values;
- an image expander for expanding the separated image compressed data obtained by compressed data separator;
- a depth representative value expander for expanding the separated depth representative value compressed data;
- a depth determiner for determining the depth of each pixel unit from the expanded depth representative values by using area dividing information which is provided from said image expander;
- a three-dimensional image data generator for generating three-dimensional image data by using the expanded pickup image and the depth of the pixel unit;
- a view-point determiner for determining a view point in accordance with an instruction from a viewer; and
- a display for performing an image display according to the three-dimensional image data and the view-point information.

44. A three-dimensional image decoding system comprising:
- a compressed data separator for separating compressed data which are obtained by multiplexing compressed image information, compressed depth representative values and compressed program description;
- an image expander for expanding the separated image compressed data obtained by said data separator;
- a depth representative value expander for expanding the separated depth representative value compressed data obtained by said data separator;
- a depth determiner for determining the depth of each pixel unit from the expanded depth representative values by using area dividing information which is obtained from said image expander;
- a program description expander for expanding the compressed data of the separated program description;
- a computer graphics generator for generating computer graphics from the expanded program description;
- a three-dimensional image data generator for generating three-dimensional image data by using the expanded pickup image, the depth of the pixel unit and the generated computer graphics;
- a view-point determiner for determining a view point in accordance with an instruction from a viewer; and
- a display for performing an image display according to the three-dimensional image data and the view-point information.

* * * * *